United States Patent
Kulkarni et al.

(10) Patent No.: US 12,446,056 B2
(45) Date of Patent: Oct. 14, 2025

(54) SYSTEMS AND METHODS FOR DYNAMICALLY CONFIGURING WIRELESS ACCESS POINTS FOR A WIRELESS LOCAL AREA NETWORK

(71) Applicant: Cisco Technology, Inc., San Jose, CA (US)

(72) Inventors: Santosh Kulkarni, San Jose, CA (US); Vishal S. Desai, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 437 days.

(21) Appl. No.: 18/165,139

(22) Filed: Feb. 6, 2023

(65) Prior Publication Data

US 2024/0267941 A1    Aug. 8, 2024

(51) Int. Cl.
*H04W 72/52* (2023.01)
*H04W 28/082* (2023.01)
*H04W 28/086* (2023.01)
*H04W 52/34* (2009.01)
*H04W 72/0453* (2023.01)

(52) U.S. Cl.
CPC ......... *H04W 72/52* (2023.01); *H04W 28/082* (2023.05); *H04W 28/086* (2023.05); *H04W 52/343* (2013.01); *H04W 72/0453* (2013.01)

(58) Field of Classification Search
CPC . H04W 72/52; H04W 28/082; H04W 28/086; H04W 52/343; H04W 72/0453
See application file for complete search history.

(56) References Cited

U.S. PATENT DOCUMENTS

| | | | |
|---|---|---|---|
| 2007/0225002 A1* | 9/2007 | Keller | H04W 16/02 455/448 |
| 2013/0028128 A1* | 1/2013 | Novak | H04B 17/382 370/252 |
| 2017/0188382 A1* | 6/2017 | Wan | H04B 1/0475 |
| 2017/0374663 A1* | 12/2017 | Lee | H04W 24/02 |
| 2018/0132108 A1* | 5/2018 | Taori | H04W 16/10 |
| 2021/0211940 A1* | 7/2021 | Berg | H04W 28/0226 |
| 2023/0328542 A1* | 10/2023 | Zhao | H04W 16/10 455/446 |

FOREIGN PATENT DOCUMENTS

| | | | | |
|---|---|---|---|---|
| CA | 3033307 C | * | 5/2021 | ......... G06Q 30/016 |
| WO | 2015/112173 | | 7/2015 | |
| WO | WO-2015112173 A1 | * | 7/2015 | ........... H04W 16/02 |

* cited by examiner

*Primary Examiner* — Yuwen Pan
*Assistant Examiner* — Swati Jain
(74) *Attorney, Agent, or Firm* — Polsinelli P.C.

(57) ABSTRACT

Dynamically configuring wireless access points (APs) in wireless local area networks (WLANs). Dynamically determines an AP configuration of cell size and frequency sub-bands of deployed dual-radio WLAN APs for improved network performance. In a first AP configuration, a first AP radio increases the power level of a micro cell while a second AP radio decreases the power level of a macro cell to provide a higher quality of service for the clients connected to the first and second co-located, same-band AP radios. If the increased power of the micro cell causes too much interference between the co-located, same-band AP radios, then a second AP configuration is dynamically applied to lock each AP radio on a different, non-overlapping frequency band, thus minimizing interference between the AP radios and improving network performance.

20 Claims, 8 Drawing Sheets

SYSTEMS AND METHODS FOR DYNAMICALLY CONFIGURING WIRELESS ACCESS POINTS FOR A WIRELESS LOCAL AREA NETWORK

TECHNICAL FIELD

The present disclosure pertains to dynamically configuring wireless access points (APs) for a wireless local area network (WLAN) and more specifically pertains to dynamically determining wireless cell size and frequency sub-bands of deployed WLAN APs.

DESCRIPTION OF RELATED TECHNOLOGY

Wireless communications systems provide various types of communications, content, and service to people around the globe. These systems, which can support communications with multiple users by sharing the time, frequency, and spatial resources of a wireless medium, can include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). These multiple access technologies have been adopted in various telecommunication standards to provide a common protocol that enables different wireless devices to communicate on a municipal, national, regional, and even global level.

One example wireless communications standard is 5G NR, which is part of a continuous mobile broadband evolution promulgated by the Third Generation Partnership Project (3GPP) to meet new requirements associated with latency, reliability, security, scalability, and other requirements. Another example wireless communications standard is the Institute of Electrical and Electronics Engineers (IEEE) 802.11 family of wireless communications standards, which governs the operation of wireless local area networks (WLANs), more commonly known as Wi-Fi networks.

In recent years, IEEE 802.11 WLANs have soared in popularity due to their low costs and deployment ease. An incredible number of WLAN Access Points (APs) are being deployed every day to meet the growing demands of WLAN capacity. Therefore, enterprise Wi-Fi deployments, e.g., with a single AP operating on dual 5-GHz frequency bands, are usually highly dense. Many of the newly deployed APs are capable of operating multiple 5-GHz radios on the same frequency bands. However, having multiple radios sharing a frequency band on the same AP gives rise to issues such as receiver blocking and excessive transmitter noise floor. To overcome such issues, AP vendors typically employ solutions such as reducing coverage cell size among co-located, same-band radios or limiting co-located, same-band radio operations to non-overlapping frequency sub-bands.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims. The drawings, which are not necessarily to scale, include:

DETAILED DESCRIPTION

Figure 1:
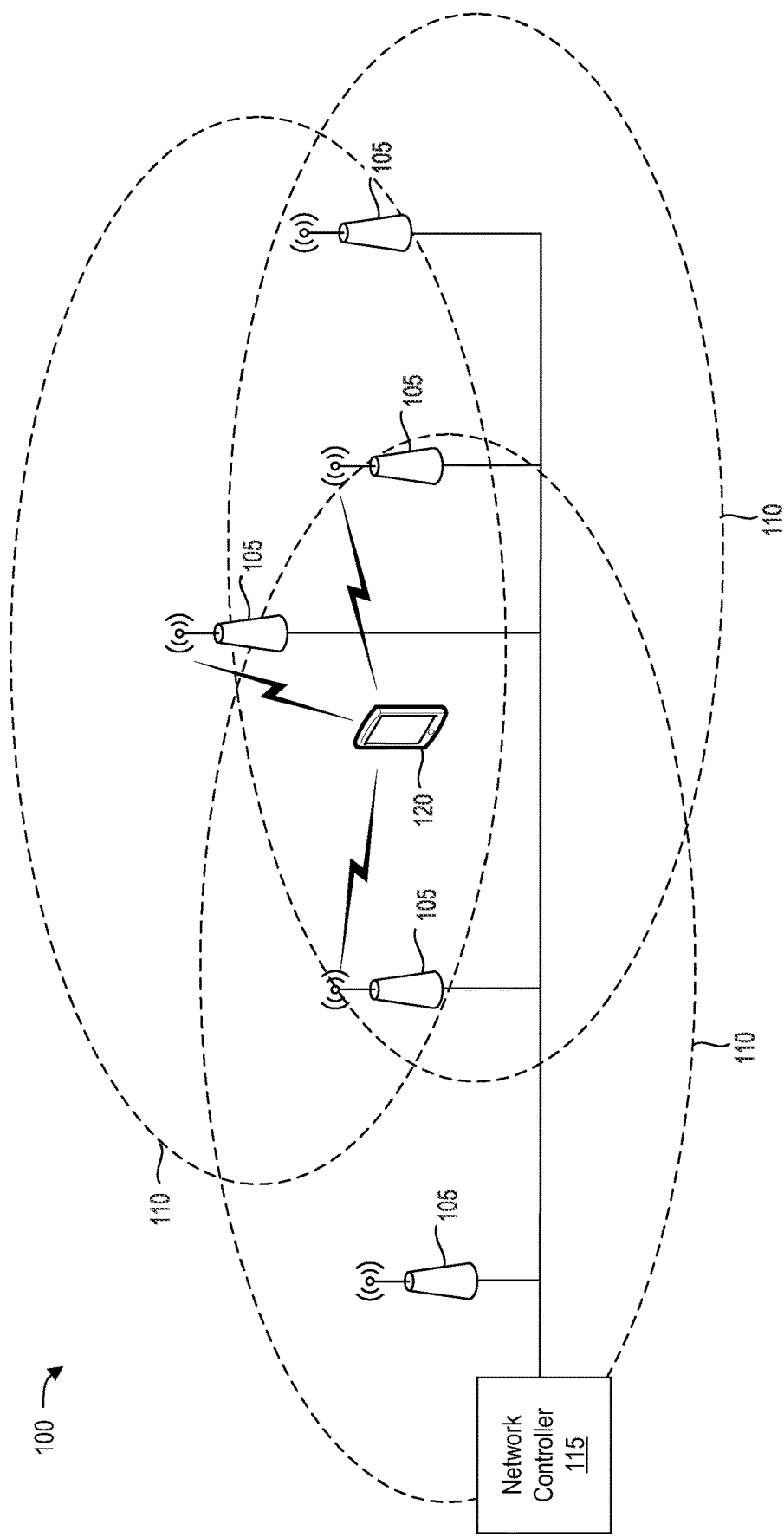
FIG. 1 illustrates an example of a network environment for one or more access points (APs) of a Wireless Local Area Network (WLAN), in accordance with some aspects of the disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

Reference to "one embodiment" or "an embodiment" means that a particular feature, structure, or characteristic described in connection with the embodiment can be a reference to the same embodiment or any embodiment, and the particular feature, structure, or characteristic is included in at least one embodiment of the disclosure. The appearances of the phrase "in one embodiment" or "in some embodiments" in various places in the specification are not necessarily all referring to the same embodiment(s), nor are separate or alternative embodiments mutually exclusive of other embodiments. Moreover, various features are described that can be exhibited by some embodiments and not by others.

Unless specifically defined, the terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Methods, systems, and computer-readable media are disclosed for dynamically configuring wireless access points (APs) for a wireless local area network (WLAN) and more specifically for dynamically determining wireless cell size and frequency sub-bands of deployed WLAN APs, even after the WLAN APs have been deployed.

Disclosed embodiments of the methods, systems, and computer-readable media leverage information about network conditions for a particular deployment to dynamically determine an AP configuration as network conditions change. Various embodiments can dynamically determine wireless cell size and frequency sub-bands as and after WLAN APs are deployed for optimizing AP capacity and performance, such as related to minimizing or eliminating receiver blocking and minimizing transmitter noise floor.

In one example embodiment, a method, performed by a network controller, for dynamically configuring a deployed wireless access point (AP) by flexible radio assignment of varying cell sizes and frequency bands, includes determining a frequency band of the deployed wireless AP; determining that a threshold number of client devices are in a wireless coverage area of the deployed wireless AP on the frequency band; determining a proximity, to the deployed wireless AP, of two or more of the client devices; determining, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio;

determining that the second number of the two or more client devices that could be served by the second radio is less than a preset value; computing available channel choices using regulator and interference factors; determining that a number of the available channel choices exceeds a threshold number of channels; and selecting, in response to the number of available channel choices exceeding the threshold number of channels, a band-locked configuration for the first radio and the second radio.

Additionally, when the first radio is on Unlicensed National Information Infrastructure (UNII) frequency bands UNII-1 and UNII-2, the method further includes locking the first radio to the UNII frequency bands UNII-1 and UNII-2; and locking the second radio to UNII-2E (Extended) and UNII-3. Alternatively, when the first radio is not on UNII frequency bands UNII-1 and UNII-2, the method further includes locking the first radio to UNII-2E and UNII-3; and locking the second radio to UNII-1 and UNII-2.

Additionally, or alternatively, the method can include determining a ratio of the second number to a sum of the first number and the second number; and determining a transmit power level of the second radio from the ratio. Further, the method can include determining that the second number of the two or more client devices that could be served by the second radio is above a preset value; and selecting a meso-macro configuration instead of the band-locked configuration for the deployed wireless AP, where the first radio and the second radio are on the frequency band of the deployed wireless AP, and the first radio has a larger transmit power level than the second radio.

Further, computing the available channel choices can include evaluating the available channel choices for the first radio and the second radio based on a regulatory domain under which the deployed wireless AP is operating, a presence of neighbors, radars, rogues, or interferers, and a channel quality index (CQI); and pruning, based on the evaluating, a list of the available channel choices, wherein the frequencies having unwanted interference are removed from the list.

Prior to selecting the band-locked configuration, the method can further include determining that the first radio and the second radio are configurable to filter different frequency sub-bands based on evaluating a configuration of hardware, software, or firmware of the deployed wireless AP. Additionally, after selecting the band-locked configuration, the method can further include determining that the first number of the two or more client devices that are served by the first radio is greater than a second preset value. Additionally, or alternatively, the method can include sending an Institute of Electrical and Electronics Engineers (IEEE) 802.11h Channel Switch Announcement (CSA) to active client devices of the two or more client devices, wherein the CSA notifies the active client devices to switch sub-bands, wherein to switch sub-bands, the method can further include locking the first radio to UNII-1 and UNII-2; and locking the second radio to UNII-2E (Extended) and UNII-3.

Systems including one or more processors and memory storing computer-executable instructions, and computer-readable media storing such computer-executable instructions and executed by one or more processors, can implement and/or perform the aspects of the example method or variations on the method, as disclosed herein.

Example Embodiments

The following description is directed to certain implementations for the purposes of describing innovative aspects of various embodiments. However, a person having ordinary skill in the art will readily recognize that the teachings herein can be applied in a multitude of different ways. The described implementations can be implemented in any device, system, or network that is capable of transmitting and receiving radio frequency (RF) signals according to any communication standard, such as any of the Institute of Electrical and Electronics Engineers (IEEE) 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular, or Internet of Things (IoT) network, such as a system utilizing 3G, 4G, 5G, or 6G technology, or further implementations thereof.

Disclosed are systems, apparatuses, methods, computer readable medium, and circuits for dynamically determining cell size and frequency sub-band restrictions for access points (APs) having multiple same-band radios in a wireless network. However, disclosed systems and methods are not limited to a specific wireless technology. For example, a system can perform a method that determines an effective coverage cell size for co-located, same-band AP radios based on a present radio frequency (RF) environment around an AP. In some aspects of the disclosure, disclosed methods and systems can dynamically optimize a deployed AP configuration by dynamically selecting an AP configuration from two or more AP configurations. For example, disclosed methods and systems can select between a meso cell AP configuration or a band-locking AP configuration, based on the associated client devices and channel quality index (CQI) on Unlicensed National Information Infrastructure (UNII) frequency bands.

In this disclosure, an access point (AP) is generally referred to as a stand-alone device or computer that allows wireless devices to connect to and communicate with a wired computer network. A wireless access point (wireless AP) is generally referred to as a network device that transmits and receives data over a wireless local area network (WLAN). The wireless AP can serve as the interconnection point between the WLAN and the wired computer network. A wireless AP can serve as a base station in the WLAN. In this disclosure, APs are generally applied in Wi-Fi networks under wireless network protocols based on the IEEE 802.11 family of standards. An AP may have multiple radios, or transceivers, capable of simultaneously operating on different frequency bands. For example, an AP may have two dedicated 5-GHz radios integrated into a deployed system that can accommodate 2.4 GHz and 5 GHz frequencies. In such case, the system can switch the frequencies of the AP radios between 2.4 and 5 GHz, based on line density and load requirements, for example.

In this disclosure, a radio in an AP may be referred to as an AP radio, an AP transmitter, or an AP transceiver. For purposes of clarity, the term "AP radio" is generally used in this disclosure. The different radios in the AP may be given designation in this disclosure as a primary radio or a secondary radio, for example. In other words, in a two-radio AP, one AP radio may be designated as the primary radio and the other AP radio may be designated as the secondary radio.

Further, in this disclosure, a remote device connected to a wireless AP using Wi-Fi protocols may be referred to as a client, a wireless client, a client device, a client radio, a client transceiver, a station (STA), a STA transceiver, or user equipment (UE). For purposes of clarity, "client radio," as differentiated from an "AP radio," or a "client device," is generally used in this disclosure. Each of these client devices may be in communicative Wi-Fi connection to one or the other AP radio of an AP. Examples of client devices include cellular telephones, laptops, tablets, personal digital assistants, other mobile user devices, and end-user equipment capable of being remotely connected to a wireless AP.

The terms "macro cell," "micro cell," and "meso cell" are used in this disclosure. The terms macro cell, micro cell and meso cell can be used together to describe different technical implementations that can be on Wi-Fi, 3G, 4G, 5G, 6G, or future and past technologies. In at least one example that could likewise apply to the other technologies, a macro cell is a Wi-Fi cell that is operating around a particular AP on a relatively larger cell size than a micro cell is operating around that particular AP. This larger cell size is created with a stronger transmit power signal from one of the AP radios of a particular AP. A micro cell may be operated within a smaller cell size to provide Wi-Fi coverage to one or more client devices that are in close proximity to the other AP radio of the particular AP. The connection from the other AP radio to the one or more client devices in the micro cell may be considered to be more directional from the location of AP deployment. The smaller cell size of the micro cell is created with a weaker transmit power signal from the other AP radio. Micro cells and macro cells can each have their own advantages.

The AP can automatically determine, based on the client density (i.e., the number of client devices within a particular coverage area of an AP), how to distribute the client devices among the macro cell and micro cell. Additional infrastructure-driven load-balancing methods can efficiently steer a client device between a macro cell or micro cell. For example, each cell can be adjusted based on a traffic power control algorithm. The algorithm can run on a network controller for a particular WLAN. The algorithm can determine how big or small a cell size of a particular AP is, based at least partly on a nearby AP and the required coverage, and another cell of the particular AP could be set to the lowest allowed transmit power. For example, a macro cell around an AP can be set to a particular size and transmit power, and a micro cell around the AP can be set to the lowest transmit power. This lowest, or minimum, power of the micro cell can help minimize overdrive and/or saturation at an AP radio and can help minimize elevation of the noise floor at the macro cell. This can also allow for the macro cell to operate at a higher transmit power, using the greatest portion of the power budget for an AP. Thus, any power budget increase for the micro cell would be avoided.

Not all wireless clients support these "macro-micro" methods. Of the wireless clients that do support these methods, these wireless clients may be predominantly associated with a macro cell because wireless clients searching for a downlink beacon signal will connect to an AP with a stronger transmit signal. For example, a majority of these wireless clients will connect to a macro cell because the beacon signal of the macro cell will be stronger than the beacon signal of the micro cell. Client devices will not generally associate to the micro cell unless they are in close proximity to the AP to hear the lower-power signal of the AP radio forming the micro cell. Further, even wireless clients using these methods could make autocratic decisions based on the strength of signal that they hear, causing the load balancing methods to not yield the expected performance results in some cases. For example, even though a macro cell may be adjusted based on the traffic power control algorithm, the micro cell may be set to a minimum transmit power regardless of the needs of the wireless clients within the closest proximity to the AP and within the micro cell coverage area. This can create asymmetric load balancing where the majority of client devices associate to the macro cell, and the micro cell will have a smaller number of client devices associated with it. The asymmetric load balancing can lower the capacity of the macro cell having a single AP radio (and its available transmit power) shared between a greater number of associated wireless clients (i.e., client devices).

A meso cell architecture can solve this problem for high density deployments by forming, around a particular AP, macro and meso cells that adjust their cell size dynamically based on the presence of the RF proximity of wireless clients to the AP radios of the particular AP, antenna orientation of the AP, and density of neighboring APs around the particular AP. The term high density, with regard to an AP deployment, refers to a density, for example of connected client devices, that is greater than the network as a whole, for example a crowded space, an area with lots of user traffic, or a temporarily busy space. The approach is generally termed as a "meso-macro" approach. Generally, to arrive at a meso cell, a micro cell could be elevated to increase its cell size, thus improving a wireless station's signal-to-noise ratio (SNR) without impacting the macro cell's performance. In a meso cell architecture, the transmit power of both AP radios can be dynamically set instead of keeping the AP radio of the micro cell at the lowest power. The dynamic power of the micro cell can be set based on the power assignment of the co-located macro cell and the presence of wireless clients in the vicinity of the micro cell. Thus, both the macro cell power level and the micro cell power level can be adjusted dynamically to improve the transmit signal to all of the wireless clients within the coverage area of an AP and to minimize intra-AP interference on the same-band, co-located radios of the AP. Adjusting the meso cell can maximize the overall AP capacity, by, for example, maximizing the performance of both AP radios connected to all of the wireless clients, in the aggregate, instead of only maximizing the performance of one of the AP radios connected to a portion of the wireless clients. The meso-macro approach can maximize channel-reuse in high density environments while enabling smaller cell size on one of the AP radios that offers limited coverage.

The determination of a meso cell's transmit power budget between two radios of an AP is performed in a closed loop analysis of the power needs of the two radios. The transmit power budget can be balanced between the two AP radios in a ratio of the overall transmit power available from the AP. For example, the system can determine the ratio of the number of client devices in the meso cell to the sum of the client devices in the meso and macro cells and determine a transmit power level of the second AP radio serving the client devices in the meso cell in direct proportion to the full transmit power available from the AP (encompassing both first and second AP radios) that serves all of the active client devices in proximity to the AP.

A meso cell can be designed to factor in frequency separation (e.g., spectrum edge to edge) between the radios of the same AP to determine a level of tolerance to increase the second AP radio's transmit power in relationship to the first AP radio's transmit power. For example, a frequency separation within a dynamic range between 100 MHz and 180 MHz can be considered when determining the transmit power budget increase for each AP radio in a meso cell deployment. Yet the potential for intra-AP interference of these same-band, co-located AP radios still exists, because increasing the micro cell's power too much may inject unwanted in-band interference between the radios of the AP. If this occurs, a band-locking configuration may perform better.

As used in this disclosure, the term "band-locking" refers to a mode of operation for a wireless AP such that each radio of the AP operates on a subset of frequency channels, effectively isolating or restricting the communications, and the transmit power associated with those communications, on separate subsets of frequency channels. For example, the first AP radio may lock, or be restricted, to one set of Unlicensed National Information Infrastructure (UNII) frequency bands and the second AP radio may lock, or be restricted, to another set of non-overlapping UNII frequency bands. For example, the first AP radio may support UNII-1 and UNII-2 bands while the second AP radio may support UNII-2E (extended) and UNII-3 bands, or vice versa. As would be understood by a person having ordinary skill in the relevant art, other combinations of frequency band assignments could be used. The cell coverage areas of both AP radios may utilize a maximum transmit power because the frequency bands are non-overlapping and the full transmit power in one band will not cause interference in the other band for the co-located radios of the AP. Thus, a deployment in "band-locking" mode could be said to have a "macro-macro" configuration. This approach of restricting, via software, the allowed frequencies on the two AP radios to non-overlapping UNII bands can offer high cell coverage from both AP radios but could impact channel reuse and therefore lead to suboptimal channelization in some situations.

Considering the limitations of either the meso-macro approach and the band-locking approach, a tradeoff determination can be made, by a network controller of the system, between the meso-macro and band-locking modes. The system can dynamically toggle between the modes for a given RF density to identify candidate APs that would benefit from the meso-macro approach to maximize channel reuse conditions and other candidate APs that would benefit from the software-defined band-locking approach to maximize AP radio coverage.

Various aspects of the application will now be described with respect to the figures.

FIG. 1 illustrates an example of a network environment 100 for one or more APs 105 of a WLAN, in accordance with some aspects of the disclosure. The network environment 100 includes one or more APs 105 that communicate with various devices within a corresponding transmission region 110 that corresponds to the geographic area that an AP 105 can communicate within based on transmission power. The coverage area of each AP 105 can partially overlap the coverage area of another AP 105 to ensure suitable geographic coverage of a region. An example of a region includes a building, a campus, or another configuration of indoor and/or outdoor space relating to an entity. The region can include a portion of a building, a campus, or another configuration of indoor and/or outdoor space relating to an entity. The region can also include a space otherwise undesignated as such a region within a neighborhood, city, or district. For example, the network environment 100 can be a temporary network environment for a business meeting, a sports complex, or other space or event within which various devices can communicate with one or more APs.

Each AP 105 can be connected to and form a system with a network controller 115 via a backhaul interface (e.g., an Ethernet network) to connect to another network (e.g., a core network associated with a wireless carrier, a core network associated with a network provider, etc.). In accordance with some aspects of the disclosure, network controller 115 can carry out dynamic, contention-aware and traffic control power algorithms, including an enhanced Flexible Radio Assignment (FRA) algorithm, for toggling and load balancing AP configurations, as described herein. The network controller 115 can determine and use contention-aware information, such as client distribution and network density, to determine AP configurations for optimizing network performance, and to transmit configuration commands to the APs. Each AP 105, following the guidance of the network controller 115, can coordinate resources with other APs. For example, each AP 105 can automatically configure a channel based on a neighboring AP to prevent interference in overlapping broadcast areas.

As illustrated in FIG. 1, a user equipment (UE) 120 (e.g., a client radio or client device) can be positioned to receive signals from one or more APs 105. A plurality of APs 105 can overlap and enable each AP 105 to listen to other APs. In some cases, each AP 105 can transmit a beacon (e.g., an IEEE 802.11k beacon) to identify other objects within the AP's respective transmission region 110. This allows an AP 105 to be informed of other devices and the transmission characteristics of the other devices to allow the AP 105 to configure its transmission parameters, such as a channel (e.g., an assigned block of frequencies for communication), transmission power, scheduling, and other information.

Figure 2A:
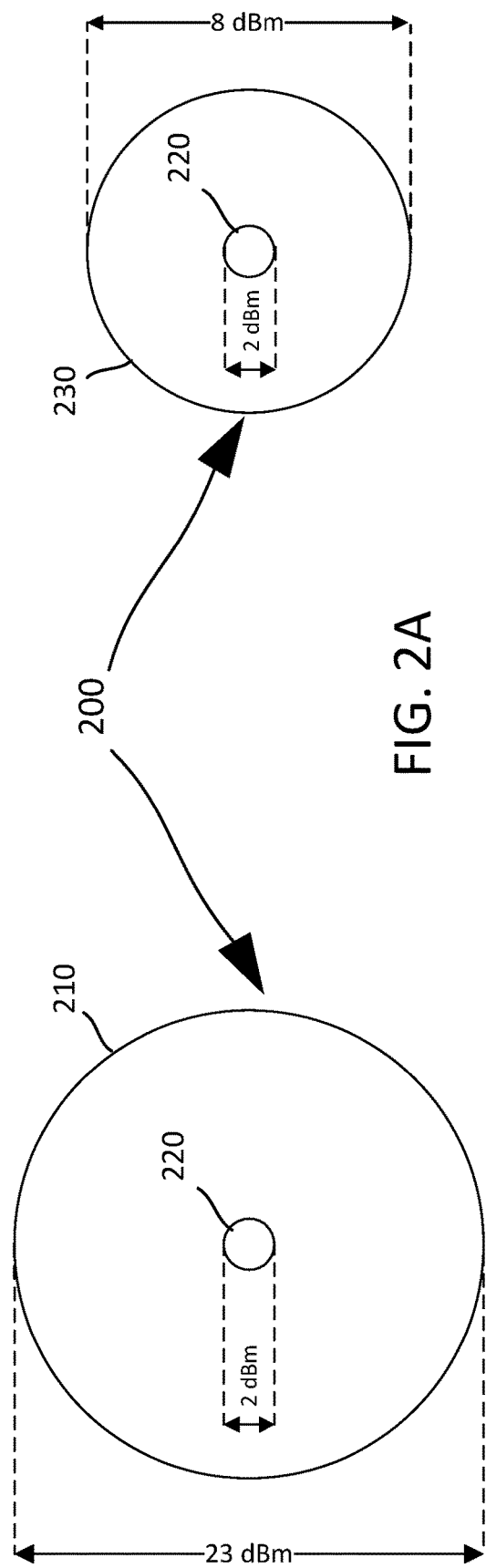
FIG. 2A illustrates an example of a conventional macro-micro AP configuration, in accordance with some aspects of the disclosure.

FIG. 2A illustrates an example of a conventional macro-micro AP configuration 200, in accordance with some aspects of the disclosure. The macro-micro AP configuration 200 will not adjust the micro cell 220 to account for a reduction in the power of a macro cell 210, 230. The larger, or macro, cell 210, 230 can be managed by a transmit power control, based on a coverage model that requires a larger cell size to provide effective Wi-Fi coverage, or based on a high density model for a denser network having a smaller, or micro, cell size that can be effective to minimize the core channel contention. For such a macro-micro AP configuration, the macro cell 210, 230 would automatically be adjusted based on the transmit power control, and the micro cell 220 would be fixed on the lowest power. Irrespective of using the coverage model or the high density model, the size of the micro cell 220 would not change. The size of the micro cell 220 could be set to the lowest power allowed, for example a −1 dBm input path. Four transmit antennas can provide a fixed 2 dBm as a total power output of the micro cell 220, and this cell size would not change. It could be assumed that the macro cell 210, 230 will be on a relatively higher power compared to the micro cell 220.

Therefore, if another macro cell were created at the same location with a similar size, the two macro cells could interfere with each other. To avoid interference, first, the macro cell would steer only the client devices that are in close proximity of the respective AP radio of the macro cell, i.e., for a special segmentation of the client distribution. Second, the larger macro cell operating at the higher power would increase the noise floor, and the signal-to-noise ratio (SNR) would be deprived. To mitigate these issues, the micro cell 220 in the macro-micro configuration 200 can always be kept at a smaller size, offsetting the impact of the increased noise floor and associating the client devices that are in close proximity to the smaller cell with a stronger received signal strength indicator (RSSI).

The macro-micro configuration 200 may impose some limitations in practice. For example, as shown in FIG. 2A, it may be assumed that the macro cell 210 would be maintained at a larger size. For example, the macro cell can be set at a transmit power within a range of 17-23 dB and adjusted based on the density of the particular access point deployment. In practice, algorithms for a macro-micro configuration applied to highly dense access point deployments may reduce the size of the macro cell 210 to a significantly smaller radius 230 (as shown in FIG. 2A), such as 5 dBm or 8 dBm, or even as small as 2 dBm. Again, in the conventional macro-micro configuration, the size of the micro cell 220 is fixed at the lowest power of 2 dBm, regardless of whether the macro cell 210, 230 is operating at a cell size of 2 dBm, 8 dBm, or 23 dBm, for example. The macro cell size could be reduced to approximately the same size as the micro cell size, but the size of the micro cell in the macro-micro configuration will not be changed to account for the reduction in the power of the macro cell.

Figure 2B:
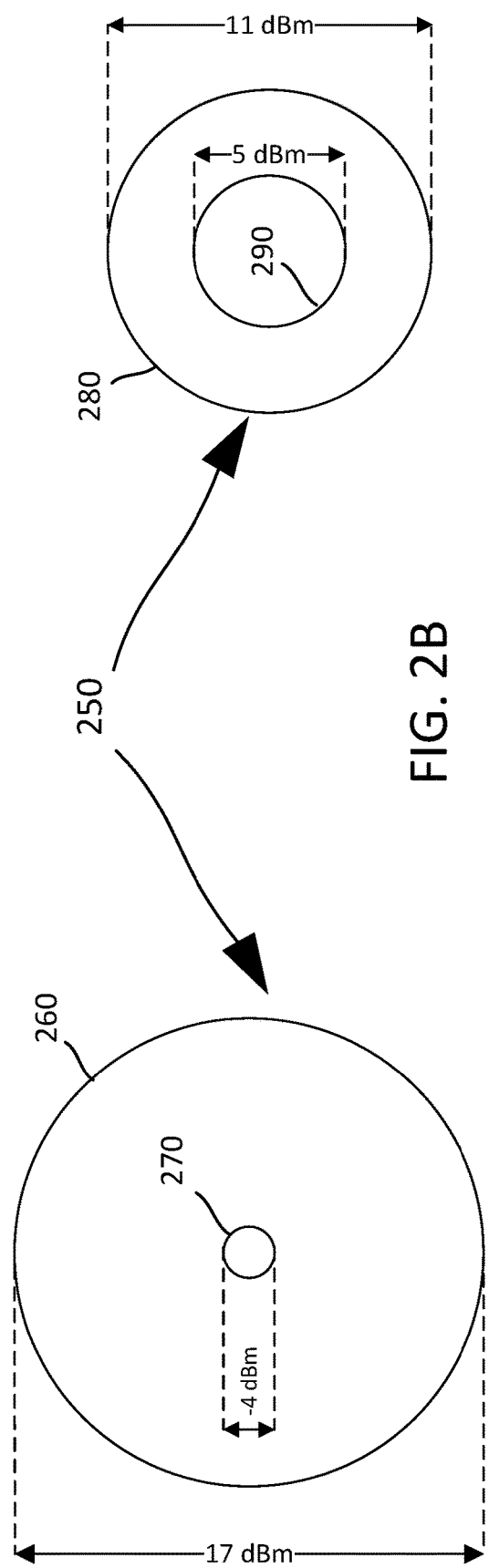
FIG. 2B illustrates an example of a meso cell AP configuration, in accordance with some aspects of the disclosure.

In contrast, FIG. 2B illustrates an example of a meso cell AP configuration 250, in accordance with some aspects of the disclosure. The meso cell configuration of FIG. 2B implements dynamic, contention-aware algorithms, providing more flexibility in adjusting the micro cell size as well, based on the macro cell size, the density of the client devices around each access point deployment, and the relationship of the access points to each other, for example. As further illustrated in FIG. 2B, as the macro cell size is adjusted (e.g., from macro cell 260 to macro cell 280), so too can the micro cell size be adjusted (e.g., from micro cell 270 to micro cell 290) to create a better distribution of the clients between the access point radios. The meso cell configuration can determine the cell size based on the client density and other parameters.

When multiple co-located AP radios are operating in the same band, transmission from one radio can overdrive, that is, saturate, a receiver on the adjacent radio. The saturation can impact media access control (MAC) measurements and elevate noise floor (NF) readings on those radios. To overcome such issues, AP vendors typically implement one of two solutions: (1) a meso-macro architecture, which limits the transmit power of the same-band adjacent AP radio; or (2), a band-locking architecture, which restricts operating frequencies of the co-located, same-band AP radios to non-overlapping sub-bands. The appropriate architecture to use may be based, at least in part, on the overall density requirements of a deployment. The overall density requirements may be based on or include a number of clients, a number of available access points, an amount of contention on each band (e.g., UNII-1, UNII-2, UNII-2E, and UNII-3), and other aspects of the radio frequency (RF) environment in which the radios operate.

The meso-macro architecture is based on a coverage requirement related to the location of a client with respect to an AP. In the meso-macro architecture, one AP radio will operate as a macro cell to provide the widest coverage, while the other AP radio will operate as a meso cell to lower noise floor elevation on the macro cell and improve the overall RF performance. While both AP radios may have a full set of channels available to select from, the majority of the client devices connected to the AP may associate to the AP radio serving the macro cell due to its higher transmit power. This architecture may best be used in a coverage-based deployment having fewer APs such that each AP may require higher cell power, versus a dense environment with more APs, where each AP does not need to operate at the higher cell power. Estimating a client's proximity to the meso cell and then steering it accordingly in order to load balance are challenges with this approach, which this disclosure addresses and resolves.

In a band-locking architecture, otherwise known as "macro-macro," co-located AP radios are consigned, or restricted, to operate in non-overlapping sub-bands, allowing them to operate at higher transmit powers without overdriving the receivers on the co-located, same-band AP radios. This frequency band restriction for co-located AP radios can be implemented via hardware band-pass filters or in software, where the software implementation can deliver comparable results when the non-overlapping sub-bands are sufficiently wide apart. "Sufficiently wide apart" may refer to a dynamic range between 100 MHz to 180 MHz, providing frequency separation (e.g., spectrum edge to edge) between the radios of an AP. However, band-locking radios can limit the number of channels available for a radio. For example, locking a primary AP radio in the 5-GHz spectrum to UNII-1 and UNII-2 bands and locking a secondary AP radio to UNII-2E and UNII-3 bands would not be helpful when a certain band or bands, e.g., the UNII-3 band, is not available for Wi-Fi in certain regulatory domains, leaving mostly dynamic frequency selection (DFS) channels for the secondary AP radio.

DFS is a spectrum-sharing mechanism that allows WLANs to coexist with radar systems. It automatically selects a frequency that does not interfere with certain radar systems while operating in the 5-GHz band. DFS detects radar interference and moves the wireless network to another frequency with no interference. It maintains a list of channels where radar has been detected in the non-occupancy list (NOL). The AP avoids using these channels for at least 30 minutes after detecting radar on them. When DFS is enabled, the AP looks for radar detection before securing a frequency channel and scans continuously for radar signal patterns during normal operation.

When DFS is enabled, if an AP wants to operate on one of the 5 GHz channels (5.470 to 5.725 GHz), the AP must continuously scan that channel for any presence of radar and must cease transmission on that channel if it detects a radar source. Therefore, the AP might move or hop to a different, less noisy channel to reduce interference. The existing wireless client devices (connected to the AP on the older channel) may "time out" while waiting to receive a new beacon from the AP, and those client devices that have timed out must begin scanning to discover the new channel on which the AP is operating. If the disruption is long enough, a client device may need to reassociate, reauthenticate, and request an IP address. To allow minimal disruption, the connected client devices can be notified of this change in channel by the AP so that they can move to the same channel with minimum downtime. This information can be shared as an IEEE 802.11h Channel Switch Announcement (CSA). The CSA can include the new channel number, a parameter to count the number of beacons before switching, and information of restrictions on transmission until a channel switch. Thus, not only would the secondary AP radio have to vacate a DFS channel whenever it detects radar, but it also has to spend processing time—up to 10 minutes in certain regulatory domains—assessing channel availability on every channel switch. This would have a significant impact on quality of service and overall network performance.

Additionally, quality of service may be affected by suboptimal channel distribution that can lower the channel quality and make a channel not very usable. Suboptimal channel distribution may be based on multiple factors. Increased noise floor can be caused by Wi-Fi interferer devices on the open Wi-Fi shared frequency spectrum. For example, a certain consigned band may have a higher amount of contention, e.g., devices injecting wideband interference may be operating on a certain band, e.g., UNII-3. As another example, a band, e.g., UNII-2E, may have a higher amount of contention in a region where operating on UNII-3 is further restricted or limited due to region-specific regulations. There may be too many rogues on a channel that are transmitting at the same time, such that packet collisions cause too much interference. For bands having a higher amount of contention, which may include one or more of these issues, other frequency bands may be needed to accommodate the clients.

Instead of restricting the AP radios to a fixed set of bands, software-based band selection can be implemented to dynamically determine bands within the 5-GHz spectrum, segment the bands, and switch between the bands. Each radio can then be locked to a specific set of segmented frequencies so that they do not interfere with each other, and transmit power can be effectively set within each segmentation, and potentially maximized for the band, for both AP radios.

Rather than hardwire the communication architecture into a meso-macro or band-locking configuration, a radio resource management (RRM) solution can be applied to analyze the RF environment of the AP and dynamically determine the best solution to allow co-located, same-band AP radios to co-exist in harmony, that is, to satisfy the desired network performance of each co-located, same-band AP radio. Using RRM, an AP that was operating in meso-macro mode can later be switched to operate in band-locked mode based on the changes in an AP's RF environment. RRM's Flexible Radio Assignment (FRA) algorithm can identify whether an AP can improve its network performance by having multiple AP radios operating on the same band. The FRA algorithm can further identify the best solution to allow co-located same-band AP radios to co-exist across access points.

The FRA can take into consideration the proximity of a plurality of clients, e.g., the distance of each client to available APs. The FRA can determine an optimized configuration for operation, including the frequency isolation and power distribution across each access point to accommodate the clients that are in the closest proximity to each AP. The FRA can apply a method, such as the methods illustrated in FIGS. 5, 6, and 7, to determine a dynamic band mode for an AP.

Figure 3B:
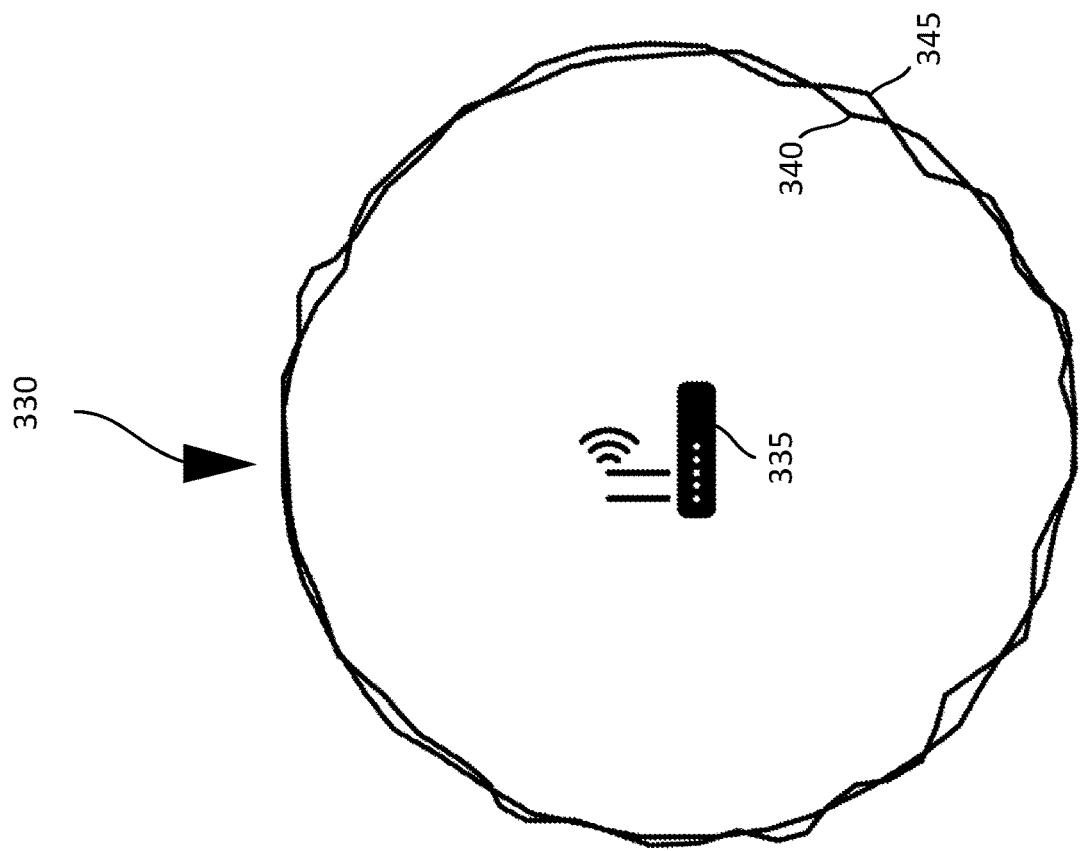
FIG. 3B illustrates a restricted frequency sub-band AP deployment for APs having two radios on the 5-GHz spectrum, in accordance with some aspects of the disclosure.
Figure 3A:
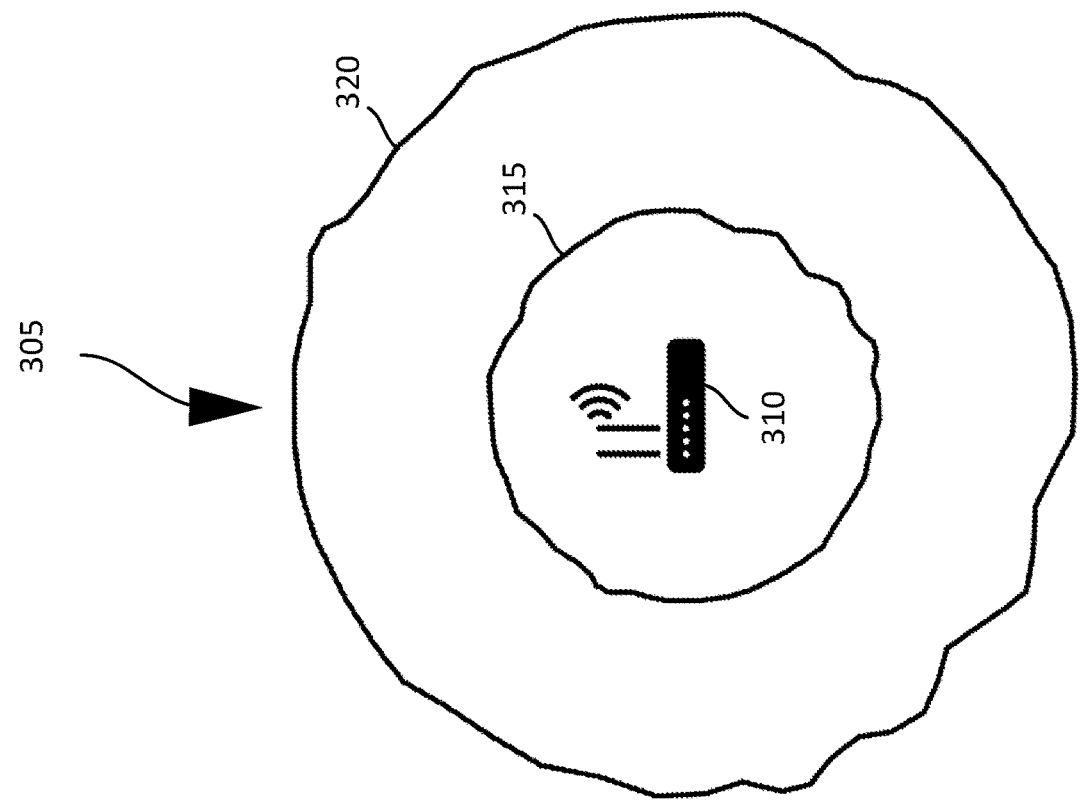
FIG. 3A illustrates a reduced-coverage meso-macro AP deployment for APs having two radios on the 5-GHz spectrum, in accordance with some aspects of the disclosure.
Figure 4B:
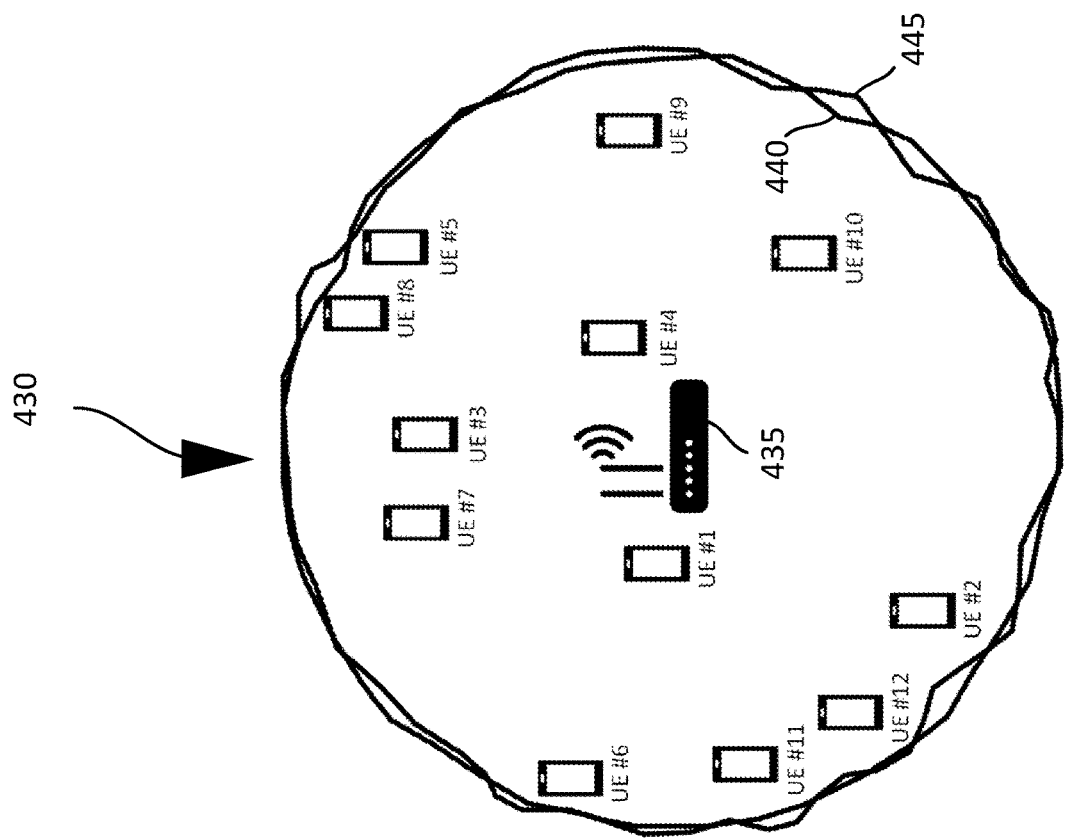
FIG. 4B illustrates a number of client devices communicating with an AP in a band-locking AP configuration, in accordance with some aspects of the disclosure.
Figure 4A:
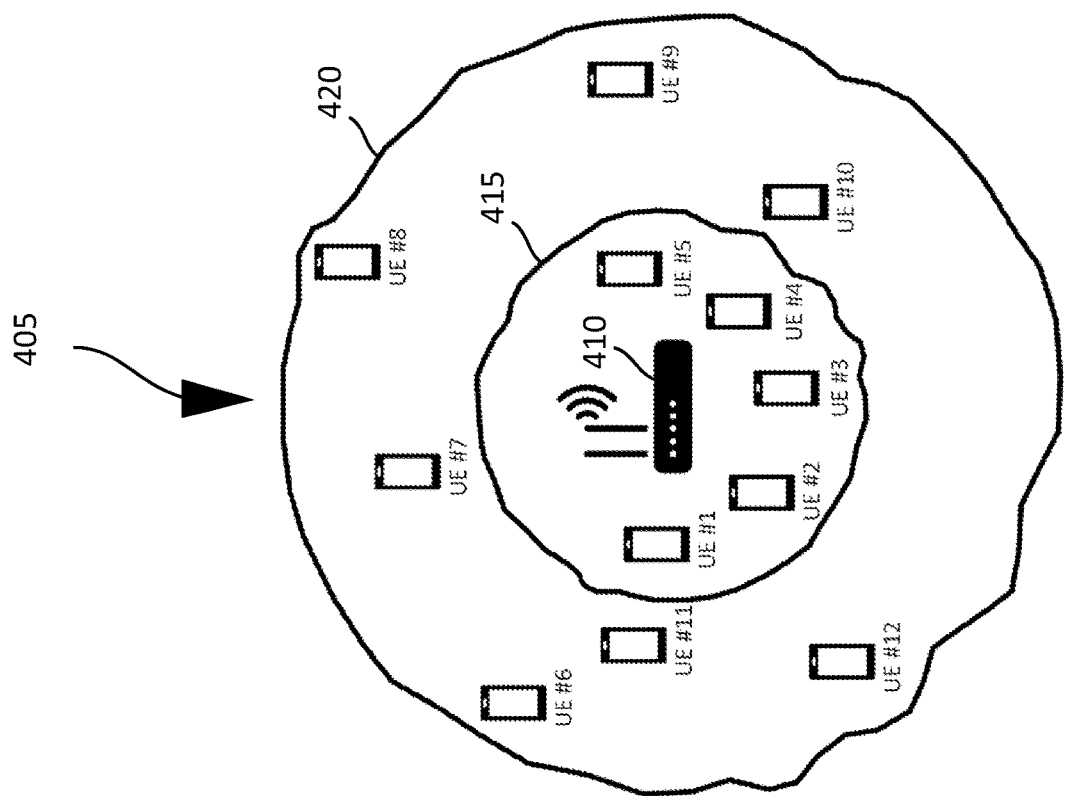
FIG. 4A illustrates a number of client devices communicating with an AP in a meso-macro AP configuration, in accordance with some aspects of the disclosure.
Figure 5:
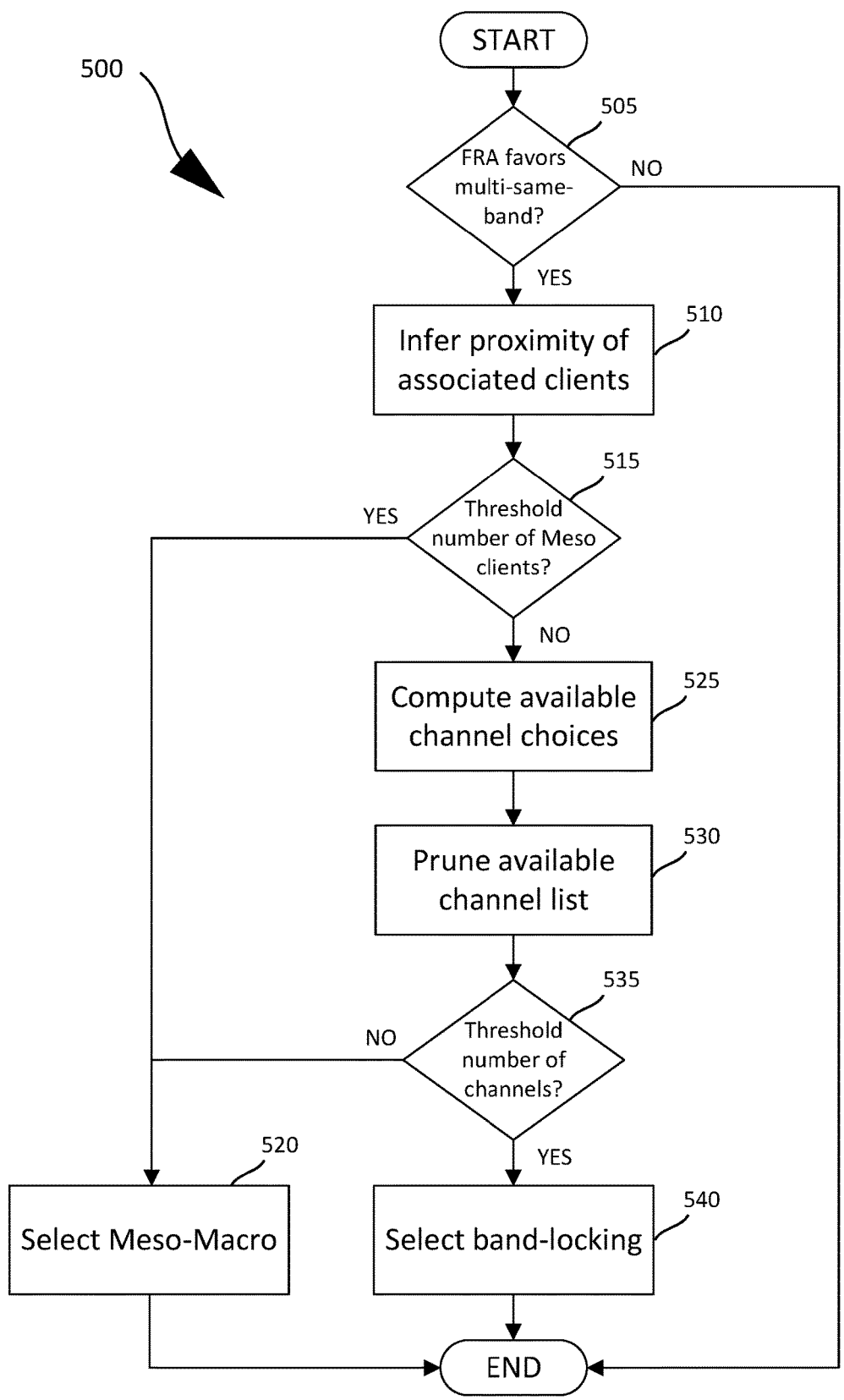
FIG. 5 illustrates a flow chart of a method for determining frequency assignment and power distribution of an AP in communication with multiple client devices, in accordance with some aspects of the disclosure.

FIGS. 3A, 3B, 4A, and 4B illustrate example configurations for an AP deployment and are described, for the sake of convenience, with respect to the method of FIG. 5.

FIG. 5 illustrates a flow chart of method 500 for determining frequency assignment and power distribution of an AP in communication with multiple client devices, in accordance with some aspects of the disclosure. That is, FIG. 5 illustrates a flow chart of method 500 for deciding between a meso-macro configuration or a band-locking configuration for the AP radios in communication with the client devices. In some aspects, method 500 can be carried out by network controller 115. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

In method 500 of FIG. 5, the system, at step 505, determines whether the client density (i.e., the number of client devices in a coverage area) includes a threshold number of multiple same-band client devices such that the FRA favors an analysis of the multiple same-band client devices for possible reconfiguration of the AP architecture. As part of this determination, the system can determine a frequency band of a deployed AP and that a threshold number of client devices are in a wireless coverage area of the deployed AP on the frequency band. The system can determine whether a specific AP configuration of the deployed AP can improve network performance by having a certain number of client devices on the frequency band of the deployed AP or on different frequency bands. The threshold number can be predetermined or can be dynamically set based on the type of deployment, e.g., in a school environment (perhaps a threshold of 80, for 100 devices), or at a hospital network (perhaps a threshold of 4, for 5 devices). The threshold number can be configured at the network controller 115, for example. For environments in which client density varies greatly, such as in an airport terminal, a dynamic setting of the threshold number based on historical data may be beneficial.

For example, at the start of method 500, the system may be defaulted to using a macro-micro architecture, and the system can use its knowledge of client density to determine whether to select a meso-macro configuration or a software-defined band-locking configuration for the AP architecture for best cell coverage and performance. For example, if there are fewer than a threshold number of client devices in the client density, there may be no need to select a specific configuration (e.g., meso-macro vs. band-locking) and potentially switch client devices between AP radios. In that case, one AP radio may be able to handle the load of the client devices at 5 GHz. In other words, the current macro-micro configuration may be serving the majority of the client devices sufficiently, and a meso cell architecture may not add additional benefit. However, if there are greater than the threshold number of client devices in the client density, the FRA will favor the analysis to determine a possible reconfiguration of the client devices in proximity to the AP radios and move to step 510.

At step 510, the system can determine, derive, or infer the proximity of each of the associated client devices to the deployed AP. For example, the system can determine or derive the proximity of the associated client devices to the AP using received signal strength indicator (RSSI)-based thresholds or by obtaining the location of the clients from a dedicated location service, such as DNA Spaces. RSSI is an estimated measure of power level that an RF client device (i.e., a client radio) is receiving from an access point or router. As would be understood by a person having ordinary skill in the relevant art, at larger distances, the signal may get weaker and the wireless data rates may get slower, leading to a lower overall data throughput. The signal can be measured by the RSSI, which in most cases indicates how well a particular AP radio can hear the remote AP-connected client devices.

The system can continue method 500 to determine a specific AP configuration associated with specific power levels and frequency distributions for the APs in the AP architecture. The system may base this determination of a specific AP configuration, at least in part, on the proximity of the associated client devices from step 510. The remaining steps of method 500 can apply an enhanced FRA algorithm to optimize the transmit power and frequency bands, associated with a selected AP configuration, across client devices in communication with the AP radios. For example, the enhanced FRA algorithm can select between a reduced-coverage meso-macro solution or a restricted sub-band (i.e., band-locked) solution.

FIG. 3A illustrates a reduced-coverage meso-macro AP deployment 305 for APs having two radios on the 5-GHz spectrum, in accordance with some aspects of the disclosure. For example, FIG. 3A illustrates AP 310, which has a meso cell coverage area 315 and a macro cell coverage area 320. The reduced-coverage meso-macro AP deployment 305, which can limit the transmit power of a same-band adjacent AP radio, may better serve the client devices when an ample number of client devices are closer to the associated AP, that is, within the coverage area of the meso cell. FIG. 4A further illustrates this concept with a number of client devices labeled UE (user equipment) #1-#12.

FIG. 4A illustrates a number of client devices communicating with an AP 410 in a meso-macro AP configuration, in accordance with some aspects of the disclosure. For example, as shown in FIG. 4A, UE #1-#5 are all in proximity to AP 410 within the meso cell coverage area 415. UEs #6-#12 are outside of the meso cell coverage area 415 but are within the macro cell coverage area 420. One radio of AP 410 can operate with higher transmit power to communicate to UEs #6-#12 as the macro cell for the best coverage for UEs #6-#12, while the other radio of AP 410 can operate with lower transmit power to communicate to UEs #1-#5 that are in closer proximity to AP 410, within the meso cell coverage area 415. The lower transmit power of the meso cell can lower the noise floor elevation on the macro cell and improve the overall RF performance of the AP configuration.

FIG. 3B illustrates a restricted frequency sub-band AP deployment 330 for APs having two radios on the 5-GHz spectrum, in accordance with some aspects of the disclosure. For example, FIG. 3B illustrates AP 335, which has a coverage area for UNII-1 and UNII-2 sub-band 340 and a coverage area for UNII-2E and UNII-3 sub-band 345. The restricted frequency sub-band AP deployment 330, i.e., a software-defined band-locked configuration, which restricts operating frequencies of same-band AP radios to non-overlapping sub-bands, may be more effective when client devices are mostly located near the periphery of the macro cell coverage area 320. FIG. 4B further illustrates this concept with a number of client devices labeled UE (user equipment) #1-12.

FIG. 4B illustrates a number of client devices communicating with an AP 435 in a band-locking AP configuration, in accordance with some aspects of the disclosure. For example, as shown in FIG. 4B, all of the UEs except for UE #1 and UE #4 are located near the periphery of what would be the macro cell coverage area 420 (see FIG. 4A). Therefore, the AP configuration shown in FIG. 4B benefits from assigning the UEs #1-#12 to either the UNII-1 and UNII-2 sub-band 440 (consigned to one of AP 435's radios) or the UNII-2E and UNII-3 sub-band 445 (consigned to the other of AP 435's radios), which are coverage areas for non-overlapping sub-bands. Because the sub-bands are non-overlapping, each of the two radios of AP 435 can operate at a higher transmit power without overdriving the receiver on each of the two AP radios. As noted earlier in this disclosure, this band-locking AP configuration can potentially limit the number of channels available to the AP radios if, for example, a regulatory domain does not allow one of the channels to be used for Wi-Fi. Hence, the disclosed FRA algorithm provides the ability to dynamically select the best configuration for the given situation.

Method 500 continues by applying such an FRA algorithm to determine whether to use a meso-macro AP configuration or a band-locking AP configuration for co-located, same-band AP radios, in accordance with some aspects of the disclosure. At step 515, the system can determine whether there are at least a threshold number of client devices in close proximity to a deployed AP, that is, within such a distance to the AP that would be within the coverage area of a pre-determined meso cell around that AP. For example, the system can determine, based at least in part on the proximity of the client devices to the deployed AP, a first number of two or more client devices that could be served by a first radio of the deployed AP operating to provide wireless coverage in the wireless coverage area (e.g., a macro coverage area) and a second number of the two or more client devices that could be served by a second radio of the deployed AP operating at a reduced transmit power level (e.g., in a meso coverage area) as compared to the first radio of the deployed AP.

Additionally or alternatively, as part of step 515, to determine the first number of the two or more client devices that could be served by the first AP radio and the second number of the two or more client devices that could be served by the second AP radio, the system can budget the total available transmit power of the AP between the first AP radio and the second AP radio by performing a closed loop analysis of the power needs of the two radios. For example, the system can determine a ratio of the second number of client devices (e.g., the number of client devices in close proximity to the meso cell) to a sum of the first number of client devices (e.g., in the macro cell) and the second number of client devices (e.g., in the meso cell). From the ratio, the system can determine a transmit power level of the second AP radio serving the client devices in the meso cell in direct proportion to the full transmit power available from the AP (encompassing both first and second AP radios) that serves all of the active client devices in proximity to the AP. The determination of the transmit power level of the second AP radio can become the reduced transmit power level for operation of the second AP radio.

In step 515, the threshold number of client devices can be a preset value that can be predetermined for the particular environment of the AP deployment or can be dynamically set based on the type of deployment. The threshold number can be configured, or preset, at the network controller 115, for example.

If there are at least a threshold number of client devices within the pre-determined meso coverage area, the system, using the enhanced FRA algorithm, can, at step 520, select the meso-macro configuration for those client devices in communication with the AP. For example, the system can determine that the second number of the two or more client devices that could be served by the second AP radio is above the preset value and select the meso-macro configuration instead of the band-locked configuration for the deployed AP. In this case, the first AP radio and the second AP radio will be on the same frequency band of the deployed AP and the first AP radio (e.g., of the macro cell) will have a larger transmit power level than the second AP radio (e.g., of the meso cell).

However, if there are not enough client devices within the meso cell's coverage area (e.g., less than the preset value for the threshold number), the method 500 can move to step 525, in which the system can evaluate or compute, using the enhanced FRA algorithm, available frequency channel choices for each AP radio based on the regulatory domain in which the associated AP is currently operating under, while also taking into account additional considerations such as the presence of any neighbors, radars, rogues, and interferers, as well as overall channel quality index (CQI) that could have a negative impact on any frequency channel being considered.

At step 530, the system can prune the available frequency channel list based on the additional considerations. For example, the system can remove frequencies from the available frequency channel list if the system detects or predicts significant or unwanted interference on the frequency channel by, e.g., the presence of one or more certain neighbors, radars, rogues, or interferers.

At step 535, the system can evaluate whether the number of available frequency channels meets or exceeds a threshold number for assigning each client device in close proximity to the AP to a different non-overlapping frequency channel of the available frequency channels for sufficient AP coverage using the band-locking configuration. If there is not the threshold number of available frequency channels for a software-defined band-locking configuration, the method 500 advances to step 520, where the system can select the meso-macro configuration for the radios of the AP. If there is a threshold number of available frequency channels for a software-defined band-locking configuration, the method 500 advances to step 540, where the system can select the band-locking configuration for the radios of the AP.

The threshold number of available frequency channels can be predetermined for a particular deployment or can be dynamically set based on the type of deployment. The threshold number can be configured at the network controller 115, for example. The threshold number of available frequency channels may be based on the threshold number of client devices that are in close proximity to the AP.

In summary, the system can first assume, as a default, that both AP radios are assigned for same-band operation. The system can then evaluate the available transmit power from the AP to determine whether there is enough power to handle the power demand from the client devices for same-band operation. The system can also evaluate whether applying the transmit power control algorithm, for example, by adjusting the cells in the meso-macro configuration, will be sufficient to accommodate the client devices. If there is not enough power overall for the client devices, or if adjusting the meso-macro configuration contributes too much interference, the system can consider channel availability for multi-band operation, thus distributing different non-overlapping frequency bands to the radios of the AP. In other words, the system can apply a frequency steering mechanism to the client devices to place certain client devices on a certain frequency band of the AP. The system can continually assess the performance of the AP for the connected client devices and dynamically shift, as needed, between same-band meso-macro and multi-band band-locking AP configurations, for example.

A person having ordinary skill in the relevant art would understand that the system can perform variations of the disclosed method 500 to reconfigure an AP for various other cell-size and frequency-band configurations.

Figure 6:
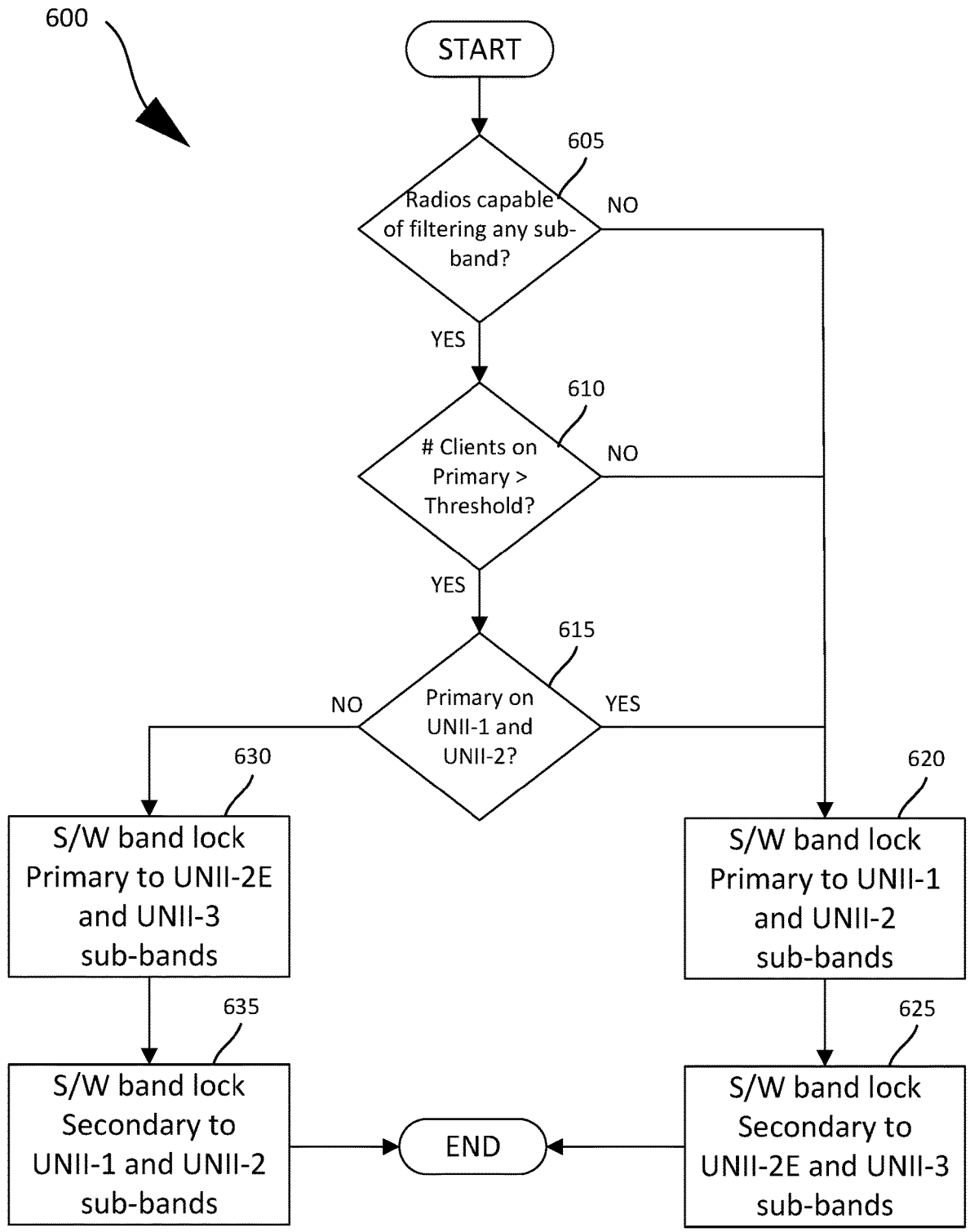
FIG. 6 illustrates a flow chart of a method for determining frequency assignment and power distribution of an AP in communication with multiple client devices, where an AP may be a legacy model device, in accordance with some aspects of the disclosure.

FIG. 6 illustrates a flow chart of method 600 for determining frequency assignment and power distribution of an AP in communication with multiple client devices, in accordance with some aspects of the disclosure. In some aspects, method 600 can be performed by network controller 115, additionally or alternatively to method 500, for deciding between a meso-macro configuration or a band-locking configuration for the AP radios in communication with the client devices, where an AP may be a legacy AP having legacy AP radios. For example, the radios of a legacy AP may have hardware, software, or firmware that filters a certain frequency band. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

At step 605, the system can determine whether the radios of the AP are capable of filtering, or are configured to filter, multiple frequency sub-bands in the 5-GHz spectrum, for example. For example, the system can determine whether the AP radios of the AP include sufficient hardware, firmware, and/or software filtering configurations for adequately separating and switching to selectable frequency sub-bands of the Unlicensed National Information Infrastructure (UNII, e.g., the UNII radio bands used for 5-GHz WLAN, such as UNII-1, UNII-2, UNII-2E, and UNII-3) for preventing interference and blocking. The system can do this, for example, by assessing the model or particular configuration of the access point installed in the system. For example, network controller 115 can read a model number of a connected AP and/or run a system check or diagnostic test to determine information about the connected radios of the AP.

If, at step 605, the AP radios are not found to be capable of filtering and/or switching to selectable UNII sub-bands, e.g., if an AP is a legacy (or older) model device, but the FRA has determined that a band-locked configuration is favored for an AP, the AP radios that are determined to be pre-configured in hardware, software, or firmware can be maintained on the AP's configured set of frequencies. This configured set of frequencies can be the set of frequencies used for a default band-locking configuration. The system can use the frequency bands of the primary AP radio and the secondary AP radio as the sub-bands for the default band-locking configuration. For example, the system can use the default band-locking configuration in which the primary AP radio can be software band-locked to the UNII-1 and UNII-2 sub-bands (at step 620), and the secondary AP radio can be software band-locked to the UNII-2E and UNII-3 sub-bands (at step 625).

If, at step 605, the AP radios are found to be capable of filtering and/or switching to selectable UNII sub-bands, the system can progress method 600 to step 610 and determine, at step 610, whether a threshold number of client devices are connected to the primary AP radio. The threshold number of client devices can be pre-determined according to the number of client devices connected to the primary AP radio that would be acceptable for effective load-balancing between the AP radios, e.g., as determined using established methods such as IEEE 802.11v Transition Management Request, IEEE 802.11k Neighbor Report, and selective probe suppression, for sufficient quality of service and overall network performance. The threshold number can also be dynamically set based on the type of deployment. The threshold number can be configured at the network controller 115, for example, as a preset value.

If, at step 610, the threshold number of client devices are not connected to the primary AP radio, there may be benefit to further switch client devices to the default band-locking configuration with the primary AP radio on UNII-1 and UNII-2 sub-bands. For example, at step 610, if the threshold number of the client devices are not connected to the primary AP radio, the system can software band-lock the primary AP radio to the UNII-1 and UNII-2 sub-bands (at step 620), and software band-lock the secondary AP radio to the UNII-2E and UNII-3 sub-bands (at step 625). Some service disruption may occur to switch the client devices to this band-locking configuration.

If, at step 610, the threshold number of client devices are connected to the primary AP radio, there may be no benefit to further disrupt and switch the client devices to other sub-bands different from the primary AP radio. At step 615, the system can determine the sub-bands that the primary and secondary AP radios are connected to and band-lock the primary and secondary AP radios accordingly. For example, at step 615, if the primary AP radio is on UNII-1 and UNII-2 sub-bands, the system can software band-lock the primary AP radio, and thus the connected client devices, to the UNII-1 and UNII-2 sub-bands at step 620. In other words, the system can band-lock the primary AP radio to the frequency channels that the AP radio is already on, given that a threshold number of the client devices are already connected to the primary AP radio. At step 625, the system can also band-lock the secondary AP radio to UNII-2E and UNII-3 sub-bands, should the additional bands be needed for load balancing and achieving quality of service and overall network performance. Minimal, or, in some cases, no service disruption will then be caused.

At step 615, if the primary AP radio is not on UNII-1 and UNII-2 sub-bands, the system can software band-lock the primary AP radio, and thus the connected client devices, to the UNII-2E and UNII-3 sub-bands at step 630. In other words, the system can band-lock the primary AP radio to the frequency channels that the AP radio is already on, given that a majority of the client devices are already connected to the primary AP radio. At step 635, the system can also band-lock the secondary AP radio to UNII-1 and UNII-2 sub-bands, should the additional bands be needed for load balancing and achieving quality of service and overall network performance. Minimal, or, in some cases, no service disruption will then be caused.

Dynamically band-locking client devices can temporarily disrupt service for existing client devices. In the event that software-defined band-locking is recommended for co-located, same-band AP radios, any service disruption can be minimized by band-locking the primary radio of the AP to the sub-band that is currently being used to service client devices while band-locking the secondary radio of the AP to other sub-bands. In the event of disruption, the client devices can be notified of an impending frequency channel change through an IEEE 802.11h Channel Switch Announcement (CSA) before software band-locking the client devices to respective sub-bands. The CSA is a mechanism for an AP to notify the connected AP radios of the AP's intention to change the operating frequency channel. This allows the client devices to hop to the frequency channel to which the AP radio is hopping and maintain the connection.

Figure 7:
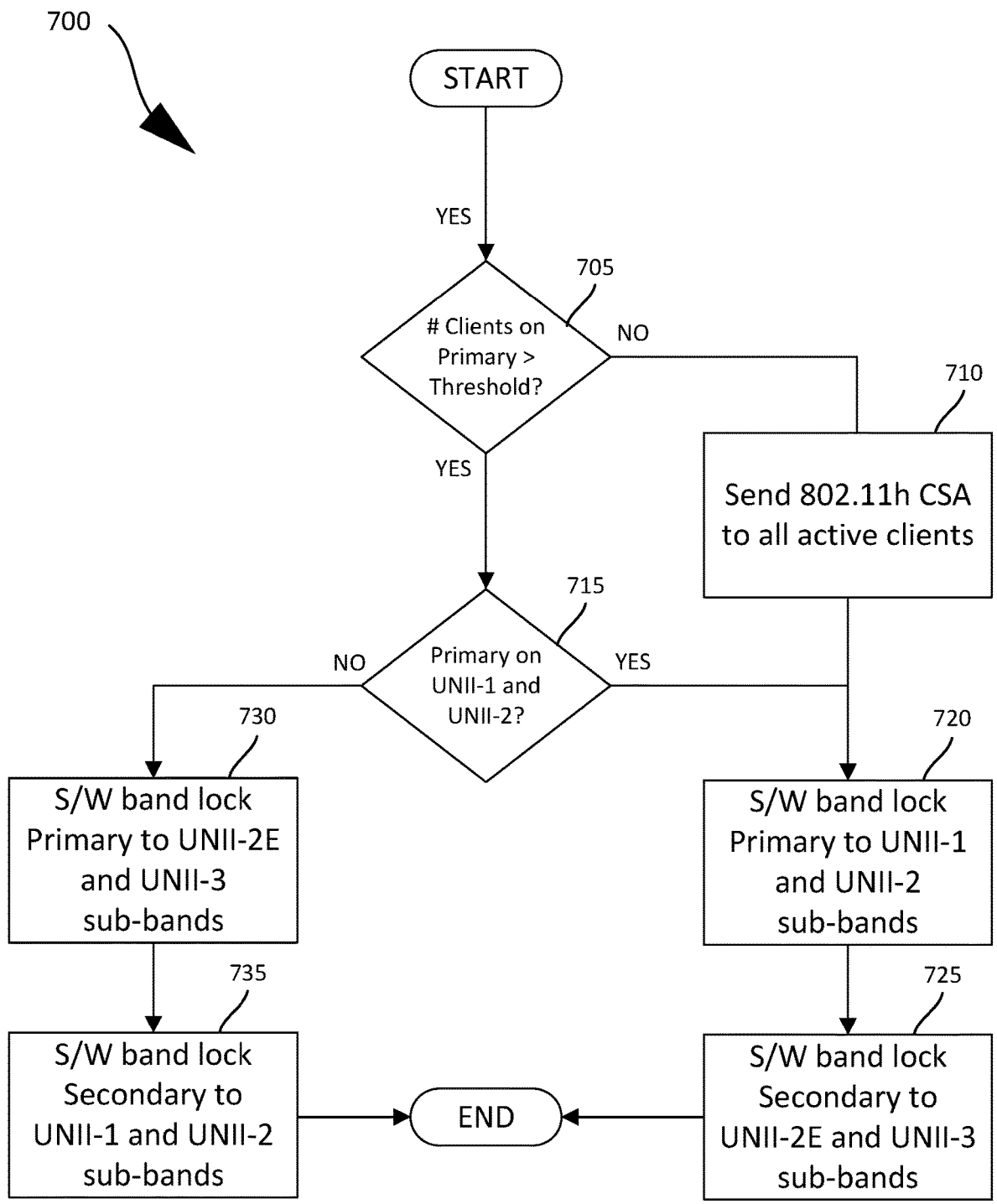
FIG. 7 illustrates a flow chart of a method for band-locking primary and secondary radios of an AP on 5 GHz to minimize any service disruption, in accordance with some aspects of the disclosure.

For example, FIG. 7 illustrates a flow chart of method 700 for band-locking primary and secondary radios of an AP on 5 GHz to minimize any service disruption, in accordance with some aspects of the disclosure. Method 700 can be used for minimizing any service disruption potentially caused by dynamically band-locking AP radios, such as by method 500. In some aspects, method 700 can be performed by network controller 115. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

At step 705, the system performing method 700 can determine whether a threshold number of client devices are connected to the primary AP radio. In some aspects, the threshold number may be a majority of client devices connected to the AP, where it is beneficial to connect the majority of the client devices to the primary AP radio for handling the majority of the communication load. In one AP deployment, the majority number may be on the order of 100 client devices, for example, for a school deployment. In another AP deployment, the majority number may be on the order of 20 client devices, as another example, for a business deployment. The threshold number can thus be predetermined for each particular deployment and configured at the network controller 115 (e.g., as a preset value).

At step 705, if a majority of the client devices are not connected to the primary AP radio, some service disruption may occur to connect the majority of the client devices to the primary AP radio. In this case, at step 710, the system can send an IEEE 802.11h Channel Switch Announcement (CSA) notification to all active client devices to switch sub-bands. As a majority of the client devices connects to the primary AP radio, the CSA allows the client devices not on the primary radio frequencies to join the majority radios on the primary radio frequencies. The system, at step 720, can then software band-lock the primary AP radio to the UNII-1 and UNII-2 sub-bands for communication with the majority of the client devices. The system, at step 725, can software band-lock the secondary AP radio to the UNII-2E and UNII-3 sub-bands.

If, at step 705, the threshold number of client devices are connected to the primary AP radio, there may be no benefit to further disrupt and switch the client devices to other sub-bands different from the primary AP radio. At step 715, the system can determine the sub-bands that the primary AP radio is connected to and band-lock the primary and secondary AP radios accordingly. For example, at step 715, if the primary AP radio is on UNII-1 and UNII-2 sub-bands, the system can software band-lock the primary AP radio, and thus the connected client devices, to the UNII-1 and UNII-2 sub-bands at step 720. In other words, the system can band-lock the primary AP radio to the frequency channels that the AP radio is already on, given that a majority of the client devices are already connected to the primary AP radio. At step 725, the system can also band-lock the secondary AP radio to UNII-2E and UNII-3 sub-bands, should the additional bands be needed for load balancing and achieving quality of service and overall network performance. Minimal, or, in some cases, no service disruption will then be caused.

At step 715, if the primary AP radio is not on UNII-1 and UNII-2 sub-bands, the system can software band-lock the primary AP radio, and thus the connected client devices, to the UNII-2E and UNII-3 sub-bands at step 730. In other words, the system can band-lock the primary AP radio to the frequency channels that the AP radio is already on, given that a majority of the client devices are already connected to the primary AP radio. At step 735, the system can also band-lock the secondary AP radio to UNII-1 and UNII-2 sub-bands, should the additional bands be needed for load balancing and achieving quality of service and overall network performance. Minimal, or, in some cases, no service disruption will then be caused.

According to some aspects of the disclosure, once the multiple, co-located same-band AP radios are operational, i.e., client devices are connected via a sub-band to one or the other of the AP radios, the system can load balance using established load-balancing methods such as IEEE 802.11v Transition Management Request, IEEE 802.11k Neighbor Report, and selective probe suppression, to achieve sufficient quality of service and overall network performance. In some situations, such as that illustrated in FIG. 4B, load balancing can be performed more effectively operating in the band-locked configuration (rather than the meso-macro configuration of FIG. 4A), where each AP radio is operating at a sufficient transmit power for the full coverage area. SNR will thus be improved for both AP radios communicating with all of the client devices in the coverage area. A larger client capacity can thus be accommodated.

Figure 8:
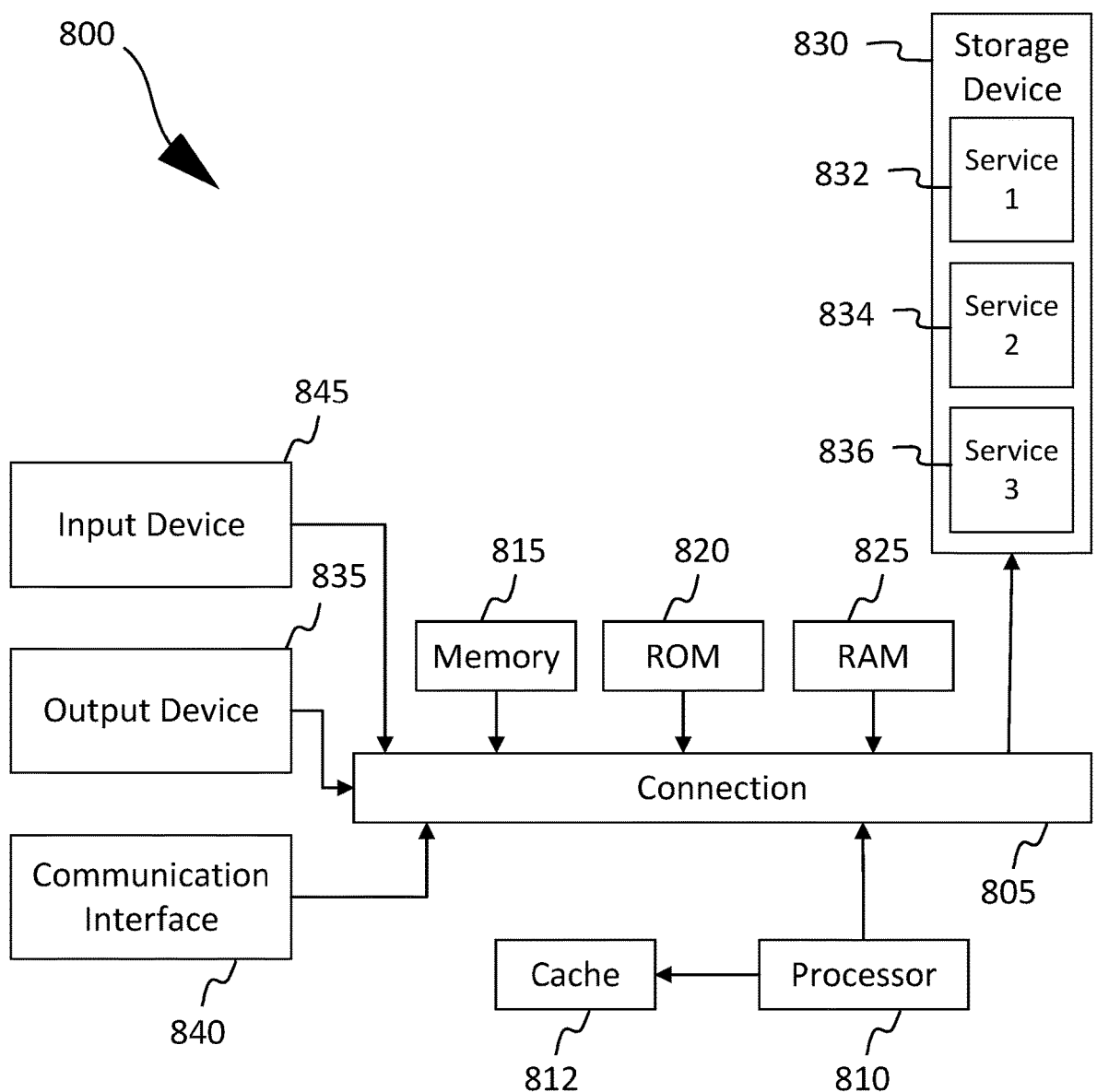
FIG. 8 is a block diagram illustrating a computer system for performing techniques described in this disclosure, in accordance with some aspects of the disclosure.

FIG. 8 is a block diagram illustrating a computing system 800 for performing techniques described herein. Computing system 800 can be, for example, any computing device for implementing aspects of the disclosed system for dynamically determining wireless cell size and frequency sub-bands of deployed WLAN APs, or any component thereof in which the components of the computing system 800 are in communication with each other using connection 805. For example, computing system 800 can be network controller 115. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc., and alternatively, or additionally, by aspects of a cloud computing system. In some embodiments, one or more of the described system components of computing system 800 can represent many such components, each performing some or all of the functions for which the component is described. In some embodiments, the components of computing system 800 can be physical or virtual devices.

Example computing system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810, as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

For example, processor 810 can be implemented as one or more microprocessors, microcomputers, microcontrollers, digital signal processors, central processing units, state machines, logic circuitries, and/or any devices that manipulate signals based on operational instructions, and can be resident in, e.g., network controller 115 of FIG. 1. In some examples, processor 810 can be one or more hardware processors and/or logic circuits of any suitable type specifically programmed or configured to execute the algorithms and processes described herein. The processor 810 can be configured to fetch and execute computer-readable processor-executable instructions stored in computer-readable media.

Storage device 830 can be a non-volatile memory device and can be a hard disk or other types of computer-readable media that can store data that are accessible by a computer, such as magnetic cassettes, flash memory cards, solid state memory devices, digital versatile disks, cartridges, random-access memories (RAMs), read-only memory (ROM), and/or some combination of these devices.

The storage device 830 can include software services, servers, services, etc., such that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

Computer-readable media can be used to store and maintain any number of functional components that are executable by processor 810. In some implementations, these functional components comprise instructions or programs that are executable by the processor 810 and that, when executed, implement operational logic for performing the actions and services attributed above to computing system 800 implementing, for example, aspects of any of FIGS. 1-7.

Computer-readable media can also optionally include other functional components and data, which can include programs, drivers, etc., and the data used or generated by the functional components, such as any elements described herein by the WLAN AP deployments and the computing system 800. In addition, the computer-readable media can also store data, data structures and the like, which are used by the functional components. The computer-readable media can include additional functional components, such as an operating system for controlling and managing various functions of and enabling user interactions with the WLAN AP deployments described herein.

Computing system 800 can include communication interface 840, which can govern and manage user input and system output. The communication interface 840 can include one or more interfaces and hardware components for enabling communication with various other devices, such as over one or more networks. The one or more networks can include, but are not limited to, any type of network known in the art, such as a local area network or a wide area network (such as the Internet), and can include a wireless network (such as a cellular network), a cloud network, a local wireless network (such as Wi-Fi and/or close-range wireless communications, such as Bluetooth®, BLE, NFC, RFID), a wired network, or any other such network, or any combination thereof. Accordingly, networks can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

To enable user interaction, computing system 800 can include an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800.

There is no restriction on operating on any particular hardware arrangement, and therefore the basic features here may easily be substituted for improved hardware or firmware arrangements as they are developed. In some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable media expressly exclude media such as energy, carrier signals, electromagnetic waves, and signals per se.

Methods according to the examples described herein (e.g., methods 500, 600, and 700) can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1: A method for dynamically configuring a deployed wireless access point (AP) by flexible radio assignment of varying cell sizes and frequency bands, the method performed by a processor of a network controller and comprising: determining a frequency band of the deployed wireless AP; determining that a threshold number of client devices are in a wireless coverage area of the deployed wireless AP on the frequency band; determining a proximity, to the deployed wireless AP, of two or more of the client devices; determining, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio; determining that the second number of the two or more client devices that could be served by the second radio is less than a preset value; computing available channel choices for the first radio and the second radio; determining that a number of the available channel choices for the first radio and the second radio exceeds a threshold number of channels; and selecting, in response to the number of available channel choices exceeding the threshold number of channels, a band-locked configuration for the first radio and the second radio.

Aspect 2: The method of Aspect 1, wherein selecting the band-locked configuration, when the first radio is on Unlicensed National Information Infrastructure (UNII) frequency bands UNII-1 and UNII-2, comprises: locking the first radio to the UNII frequency bands UNII-1 and UNII-2; and locking the second radio to UNII-2E (Extended) and UNII-3.

Aspect 3: The method of any of Aspects 1 to 2, wherein selecting the band-locked configuration, when the first radio is not on UNII frequency bands UNII-1 and UNII-2, comprises: locking the first radio to UNII-2E and UNII-3; and locking the second radio to UNII-1 and UNII-2.

Aspect 4: The method of any of Aspects 1 to 3, further comprising: determining a ratio of the second number to a sum of the first number and the second number; and determining a transmit power level of the second radio from the ratio, wherein the transmit power level of the second radio is the reduced transmit power level.

Aspect 5: The method of any of Aspects 1 to 4, further comprising: determining that the second number of the two or more client devices that could be served by the second radio is above the preset value; and selecting a meso-macro configuration instead of the band-locked configuration for the deployed wireless AP, wherein: the first radio and the second radio are on the frequency band of the deployed wireless AP, and the first radio has a larger transmit power level than the second radio.

Aspect 6: The method of any one of Aspects 1 to 6, wherein computing the available channel choices comprises: evaluating the available channel choices for the first radio and the second radio based on a regulatory domain under which the deployed wireless AP is operating, a presence of neighbors, radars, rogues, or interferers, or a channel quality index (CQI); and pruning, based on the evaluating, a list of the available channel choices, wherein the frequencies having unwanted interference are removed from the list.

Aspect 7: The method of any of Aspects 1 to 6, wherein selecting the band-locked configuration comprises: determining that the first radio and the second radio are configurable to filter different frequency sub-bands based on evaluating a configuration of hardware, software, or firmware of the deployed wireless AP, wherein the band-locked configuration is based on determining that the first radio and the second radio are configurable to filter different frequency sub-bands.

Aspect 8: The method of any of Aspects 1 to 7, wherein selecting the band-locked configuration comprises: determining that the first radio and the second radio are pre-configured in hardware, software, or firmware to filter a set of frequencies; and maintaining the first radio and the second radio on the set of frequencies for the band-locked configuration.

Aspect 9: The method of any of Aspects 1 to 8, further comprising, after selecting the band-locked configuration: determining that the first number of the two or more client devices that are served by the first radio is greater than a second preset value; determining a first frequency band of the first radio and locking the first radio to the first frequency band; and determining a second frequency band of the second radio and locking the second radio to the second frequency band.

Aspect 10: The method of any of Aspects 1 to 10, further comprising: determining that the first number of the two or more client devices that are served by the first radio is less than a second preset value; sending an Institute of Electrical and Electronics Engineers (IEEE) 802.11h Channel Switch Announcement (CSA) to active client devices of the two or more client devices, wherein the CSA notifies the active client devices to switch sub-bands, and wherein to switch sub-bands, the method further comprises: locking the first radio to UNII-1 and UNII-2; and locking the second radio to UNII-2E (Extended) and UNII-3.

Aspect 11: A system for dynamically configuring a deployed wireless access point (AP) by flexible radio assignment of varying cell sizes and frequency bands, the system comprising: a network controller comprising one or more processors; and memory storing computer-executable instructions, that, when executed by the one or more processors, cause the network controller to: determine a frequency band of the deployed wireless AP; determine that a threshold number of client devices are in a wireless coverage area of the deployed wireless AP on the frequency band; determine a proximity, to the deployed wireless AP, of two or more of the client devices; determine, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio; determine that the second number of the two or more client devices that could be served by the second radio is less than a preset value; compute available channel choices for the first radio and the second radio; determine that a number of the available channel choices exceeds a threshold number of channels; and select, in response to the number of available channel choices exceeding the threshold number of channels, a band-locked configuration for the first radio and the second radio.

Aspect 12: The system of Aspect 11, wherein to select the band-locked configuration, the computer-executable instructions, when executed by the one or more processors, further cause the network controller, when the first radio is on Unlicensed National Information Infrastructure (UNII) frequency bands UNII-1 and UNII-2, to: lock the first radio to the UNII frequency bands UNII-1 and UNII-2; and lock the second radio to UNII-2E (Extended) and UNII-3.

Aspect 13: The system of any of Aspects 11 to 12, wherein to select the band-locked configuration, the computer-executable instructions, when executed by the one or more processors, further cause the network controller, when the first radio is not on UNII frequency bands UNII-1 and UNII-2, to: lock the first radio to UNII-2E and UNII-3; and lock the second radio to UNII-1 and UNII-2.

Aspect 14: The system of any of Aspects 11 to 13, wherein the computer-executable instructions, when executed by the one or more processors, further cause the network controller to: determine a ratio of the second number to a sum of the first number and the second number; and determine a transmit power level of the second radio from the ratio, wherein the transmit power level of the second radio is the reduced transmit power level.

Aspect 15: The system of any one of Aspects 11 to 14, wherein the computer-executable instructions, when executed by the one or more processors, further cause the network controller to: determine that the second number of the two or more client devices that could be served by the second radio is above a preset value; and select a meso-macro configuration instead of the band-locked configuration for the deployed wireless AP, wherein: the first radio and the second radio are on the frequency band of the deployed wireless AP, and the first radio has a larger transmit power level than the second radio.

Aspect 16: The system of any one of Aspects 11 to 15, wherein to compute the available channel choices, the computer-executable instructions, when executed by the one or more processors, further cause the network controller to: evaluate the available channel choices for the first radio and the second radio based on a regulatory domain under which the deployed wireless AP is operating, a presence of neighbors, radars, rogues, or interferers, or a channel quality index (CQI); and prune, based on the evaluating, a list of the available channel choices, wherein the frequencies having unwanted interference are removed from the list.

Aspect 17: The system of any one of Aspects 11 to 16, wherein the computer-executable instructions, when executed by the one or more processors, further cause the network controller, prior to selecting the band-locked configuration, to: determine that the first radio and the second radio are configurable to filter different frequency sub-bands based on evaluating a configuration of hardware, software, or firmware of the deployed wireless AP, wherein the band-locked configuration is based on determining that the first radio and the second radio are configurable to filter different frequency sub-bands.

Aspect 18: The system of any one of Aspects 11 to 17, wherein the computer-executable instructions, when executed by the one or more processors, further cause the network controller, after selecting the band-locked configuration, to: determine that the first number of the two or more client devices that are served by the first radio is greater than a second preset value; determine a first frequency band of the first radio and lock the first radio to the first frequency band; and determine a second frequency band of the second radio and lock the second radio to the second frequency band.

Aspect 19: The system of Aspect 18, wherein the computer-executable instructions, when executed by the one or more processors, further cause the network controller to: send an Institute of Electrical and Electronics Engineers (IEEE) 802.11h Channel Switch Announcement (CSA) to active client devices of the two or more client devices, wherein the CSA notifies the active client devices to switch sub-bands; and wherein to switch sub-bands, the computer-executable instructions, when executed by the one or more processors, further cause the network controller to: lock the first radio to UNII-1 and UNII-2; and lock the second radio to UNII-2E (Extended) and UNII-3.

Aspect 20: A non-transitory computer-readable medium for dynamically configuring a deployed wireless access point (AP) by flexible radio assignment of varying cell sizes and frequency bands, the non-transitory computer-readable medium storing instructions, that, when executed by one or more processors of a network controller, cause the network controller to determine a frequency band of the deployed wireless AP; determine that a threshold number of client devices are in a wireless coverage area of the deployed wireless AP on the frequency band; determine a proximity, to the deployed wireless AP, of two or more of the client devices; determine, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio; determine that the second number of the two or more client devices that could be served by the second radio is less than a preset value; compute available channel choices using regulator and interference factors; determine that a number of the available channel choices exceeds a threshold number of channels; and select, in response to the number of available channel choices exceeding the threshold number of channels, a band-locked configuration for the first radio and the second radio.

Aspect 21: The non-transitory computer-readable medium of Aspect 20, wherein to select the band-locked configuration, the instructions, when executed by the one or more processors, further cause the network controller, when the first radio is on Unlicensed National Information Infrastructure (UNII) frequency bands UNII-1 and UNII-2, to: lock the first radio to the UNII frequency bands UNII-1 and UNII-2; and lock the second radio to UNII-2E (Extended) and UNII-3.

What is claimed is:

1. A method for dynamically configuring a deployed wireless access point (AP) by flexible radio assignment of varying cell sizes and frequency bands, the method performed by a processor of a network controller and comprising:
   determining a frequency band of the deployed wireless AP;
   determining that a threshold number of client devices are in a wireless coverage area of the deployed wireless AP on the frequency band;
   determining a proximity, to the deployed wireless AP, of two or more of the client devices;
   determining, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio;
   determining that the second number of the two or more client devices that could be served by the second radio is less than a preset value;
   computing available channel choices for the first radio and the second radio;
   determining that a number of the available channel choices for the first radio and the second radio exceeds a threshold number of channels; and
   selecting, in response to the number of available channel choices exceeding the threshold number of channels, a band-locked configuration for the first radio and the second radio.

2. The method of claim 1, wherein selecting the band-locked configuration, when the first radio is on Unlicensed National Information Infrastructure (UNII) frequency bands UNII-1 and UNII-2, comprises:
   locking the first radio to the UNII frequency bands UNII-1 and UNII-2; and
   locking the second radio to UNII-2E (Extended) and UNII-3.

3. The method of claim 1, wherein selecting the band-locked configuration, when the first radio is not on UNII frequency bands UNII-1 and UNII-2, comprises:
   locking the first radio to UNII-2E and UNII-3; and
   locking the second radio to UNII-1 and UNII-2.

4. The method of claim 1, further comprising:
   determining a ratio of the second number to a sum of the first number and the second number; and
   determining a transmit power level of the second radio from the ratio, wherein the transmit power level of the second radio is the reduced transmit power level.

5. The method of claim 1, further comprising:
   determining that the second number of the two or more client devices that could be served by the second radio is above the preset value; and
   selecting a meso-macro configuration instead of the band-locked configuration for the deployed wireless AP, wherein:
      the first radio and the second radio are on the frequency band of the deployed wireless AP, and
      the first radio has a larger transmit power level than the second radio.

6. The method of claim 1, wherein computing the available channel choices comprises:
   evaluating the available channel choices for the first radio and the second radio based on a regulatory domain under which the deployed wireless AP is operating, a presence of neighbors, radars, rogues, or interferers, or a channel quality index (CQI); and
   pruning, based on the evaluating, a list of the available channel choices, wherein the frequencies having unwanted interference are removed from the list.

7. The method of claim 1, wherein selecting the band-locked configuration comprises:
   determining that the first radio and the second radio are configurable to filter different frequency sub-bands based on evaluating a configuration of hardware, software, or firmware of the deployed wireless AP, wherein the band-locked configuration is based on determining that the first radio and the second radio are configurable to filter different frequency sub-bands.

8. The method of claim 1, further comprising, after selecting the band-locked configuration:
   determining that the first number of the two or more client devices that are served by the first radio is greater than a second preset value;
   determining a first frequency band of the first radio and locking the first radio to the first frequency band; and
   determining a second frequency band of the second radio and locking the second radio to the second frequency band.

9. The method of claim 1, further comprising:
   determining that the first number of the two or more client devices that are served by the first radio is less than a second preset value;
   sending an Institute of Electrical and Electronics Engineers (IEEE) 802.11h Channel Switch Announcement (CSA) to active client devices of the two or more client devices, wherein the CSA notifies the active client devices to switch sub-bands, and wherein to switch sub-bands, the method further comprises:
      locking the first radio to UNII-1 and UNII-2; and
      locking the second radio to UNII-2E (Extended) and UNII-3.

10. A system for dynamically configuring a deployed wireless access point (AP) by flexible radio assignment of varying cell sizes and frequency bands, the system comprising:
   a network controller comprising one or more processors; and
   memory storing computer-executable instructions, that, when executed by the one or more processors, cause the network controller to:
      determine a frequency band of the deployed wireless AP;
      determine that a threshold number of client devices are in a wireless coverage area of the deployed wireless AP on the frequency band;

determine a proximity, to the deployed wireless AP, of two or more of the client devices;

determine, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio;

determine that the second number of the two or more client devices that could be served by the second radio is less than a preset value;

compute available channel choices for the first radio and the second radio;

determine that a number of the available channel choices exceeds a threshold number of channels; and select, in response to the number of available channel choices exceeding the threshold number of channels, a band-locked configuration for the first radio and the second radio.

11. The system of claim 10, wherein to select the band-locked configuration, the computer-executable instructions, when executed by the one or more processors, further cause the network controller, when the first radio is on Unlicensed National Information Infrastructure (UNII) frequency bands UNII-1 and UNII-2, to:

lock the first radio to the UNII frequency bands UNII-1 and UNII-2; and lock the second radio to UNII-2E (Extended) and UNII-3.

12. The system of claim 10, wherein to select the band-locked configuration, the computer-executable instructions, when executed by the one or more processors, further cause the network controller, when the first radio is not on UNII frequency bands UNII-1 and UNII-2, to:

lock the first radio to UNII-2E and UNII-3; and lock the second radio to UNII-1 and UNII-2.

13. The system of claim 10, wherein the computer-executable instructions, when executed by the one or more processors, further cause the network controller to:

determine a ratio of the second number to a sum of the first number and the second number; and determine a transmit power level of the second radio from the ratio, wherein the transmit power level of the second radio is the reduced transmit power level.

14. The system of claim 10, wherein the computer-executable instructions, when executed by the one or more processors, further cause the network controller to:

determine that the second number of the two or more client devices that could be served by the second radio is above a preset value; and select a meso-macro configuration instead of the band-locked configuration for the deployed wireless AP, wherein:

the first radio and the second radio are on the frequency band of the deployed wireless AP, and the first radio has a larger transmit power level than the second radio.

15. The system of claim 10, wherein to compute the available channel choices, the computer-executable instructions, when executed by the one or more processors, further cause the network controller to:

evaluate the available channel choices for the first radio and the second radio based on a regulatory domain under which the deployed wireless AP is operating, a presence of neighbors, radars, rogues, or interferers, or a channel quality index (CQI); and prune, based on the evaluating, a list of the available channel choices, wherein the frequencies having unwanted interference are removed from the list.

16. The system of claim 10, wherein the computer-executable instructions, when executed by the one or more processors, further cause the network controller, prior to selecting the band-locked configuration, to:

determine that the first radio and the second radio are configurable to filter different frequency sub-bands based on evaluating a configuration of hardware, software, or firmware of the deployed wireless AP, wherein the band-locked configuration is based on determining that the first radio and the second radio are configurable to filter different frequency sub-bands.

17. The system of claim 10, wherein the computer-executable instructions, when executed by the one or more processors, further cause the network controller, after selecting the band-locked configuration, to:

determine that the first number of the two or more client devices that are served by the first radio is greater than a second preset value;

determine a first frequency band of the first radio and lock the first radio to the first frequency band; and determine a second frequency band of the second radio and lock the second radio to the second frequency band.

18. The system of claim 17, wherein the computer-executable instructions, when executed by the one or more processors, further cause the network controller to:

send an Institute of Electrical and Electronics Engineers (IEEE) 802.11h Channel Switch Announcement (CSA) to active client devices of the two or more client devices, wherein the CSA notifies the active client devices to switch sub-bands; and wherein to switch sub-bands, the computer-executable instructions, when executed by the one or more processors, further cause the network controller to:

lock the first radio to UNII-1 and UNII-2; and lock the second radio to UNII-2E (Extended) and UNII-3.

19. A non-transitory computer-readable medium for dynamically configuring a deployed wireless access point (AP) by flexible radio assignment of varying cell sizes and frequency bands, the non-transitory computer-readable medium storing instructions, that, when executed by one or more processors of a network controller, cause the network controller to:

determine a frequency band of the deployed wireless AP;

determine that a threshold number of client devices are in a wireless coverage area of the deployed wireless AP on the frequency band;

determine a proximity, to the deployed wireless AP, of two or more of the client devices;

determine, based at least in part on the proximity, a first number of the two or more client devices that could be served by a first radio of the deployed wireless AP operating to provide wireless coverage in the wireless coverage area and a second number of the two or more client devices that could be served by a second radio of the deployed wireless AP operating at a reduced transmit power level as compared to the first radio;

determine that the second number of the two or more client devices that could be served by the second radio is less than a preset value;

compute available channel choices using regulator and interference factors;

determine that a number of the available channel choices exceeds a threshold number of channels; and select, in response to the number of available channel choices exceeding the threshold number of channels, a band-locked configuration for the first radio and the second radio.

20. The non-transitory computer-readable medium of claim 19, wherein to select the band-locked configuration, the instructions, when executed by the one or more processors, further cause the network controller, when the first radio is on Unlicensed National Information Infrastructure (UNII) frequency bands UNII-1 and UNII-2, to:

lock the first radio to the UNII frequency bands UNII-1 and UNII-2; and lock the second radio to UNII-2E (Extended) and UNII-3.

* * * * *